Feb. 6, 1934.  T. R. HARRISON  1,946,280
CONTROL INSTRUMENT, APPARATUS AND METHOD
Filed Dec. 18, 1931  12 Sheets-Sheet 1

INVENTOR.
Thomas R Harrison,
BY John E. Hubbell
ATTORNEY

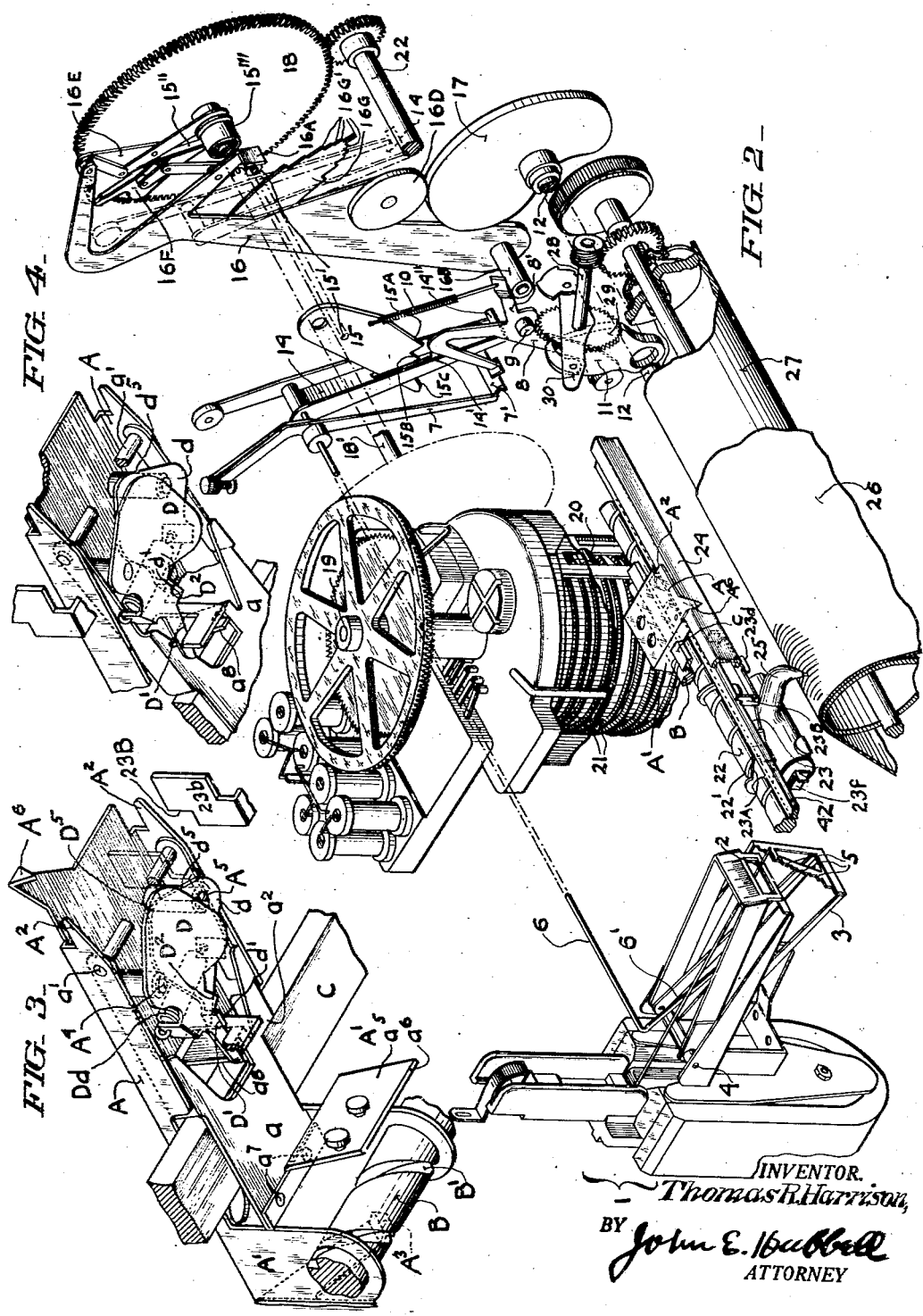

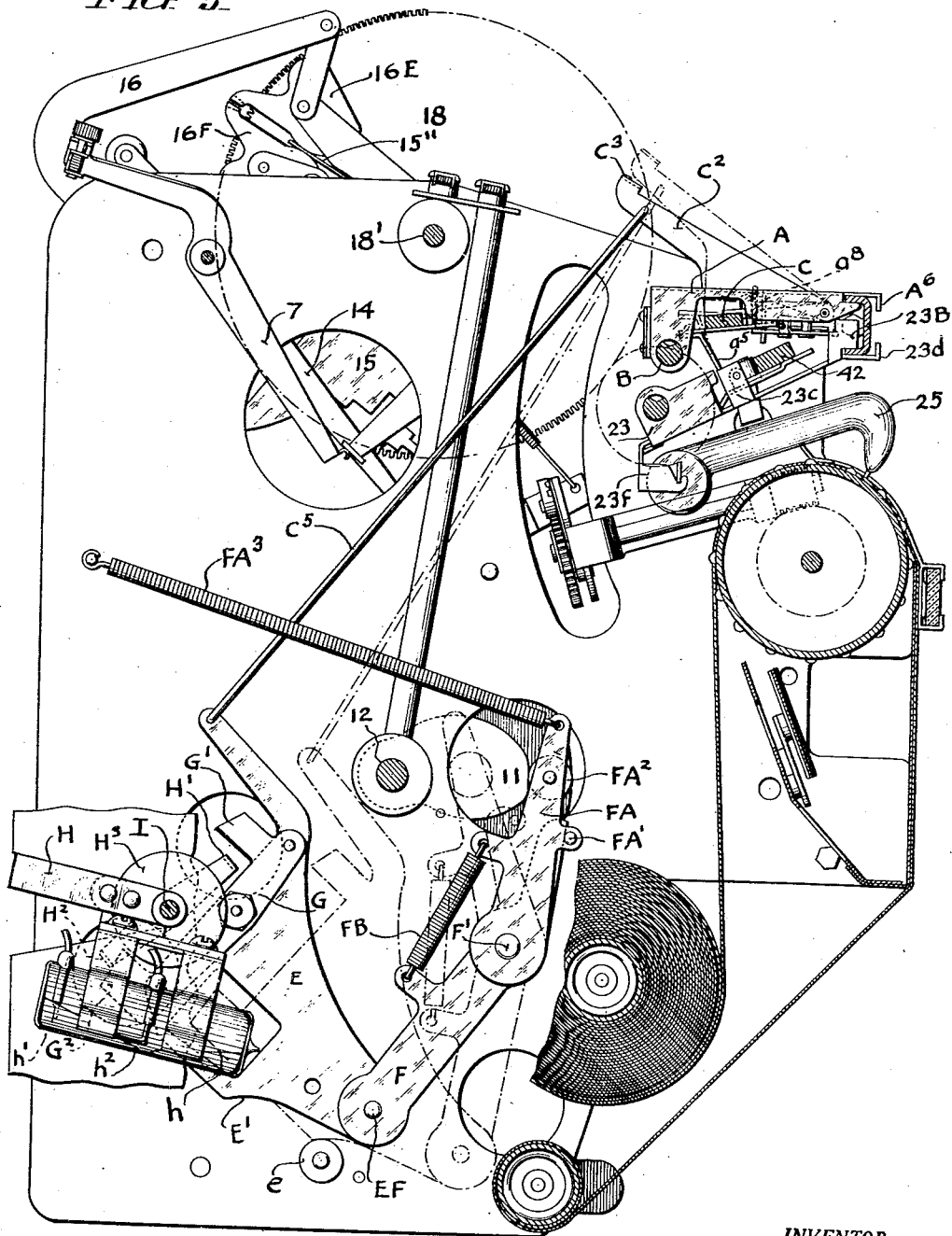

Feb. 6, 1934.    T. R. HARRISON    1,946,280
CONTROL INSTRUMENT, APPARATUS AND METHOD
Filed Dec. 18, 1931    12 Sheets-Sheet 5
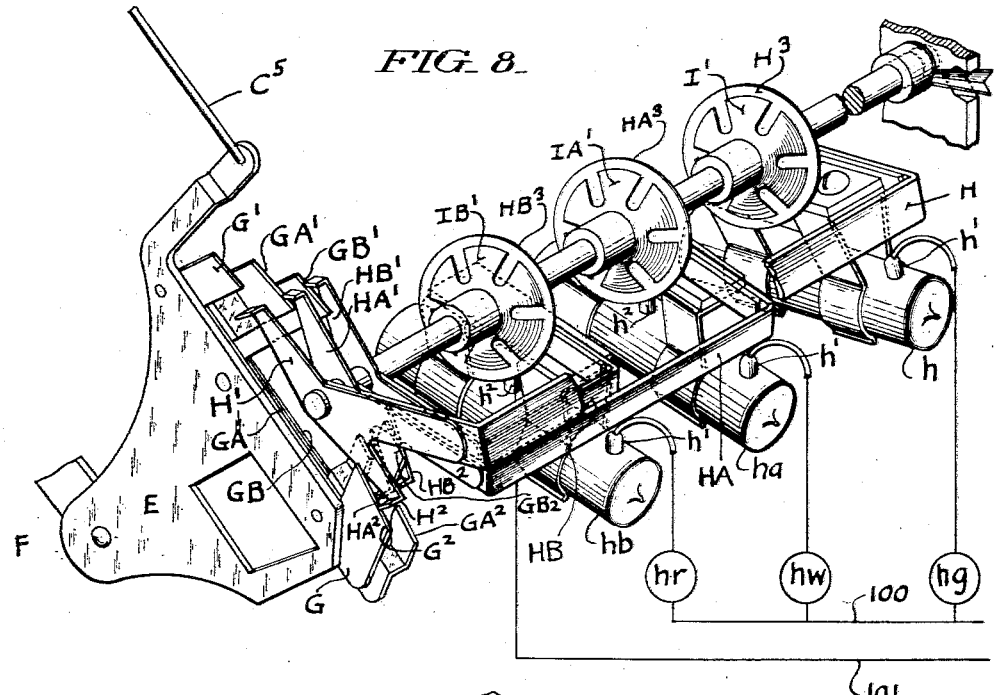
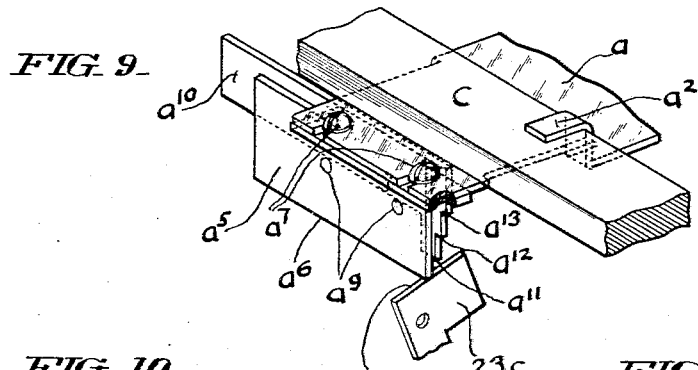
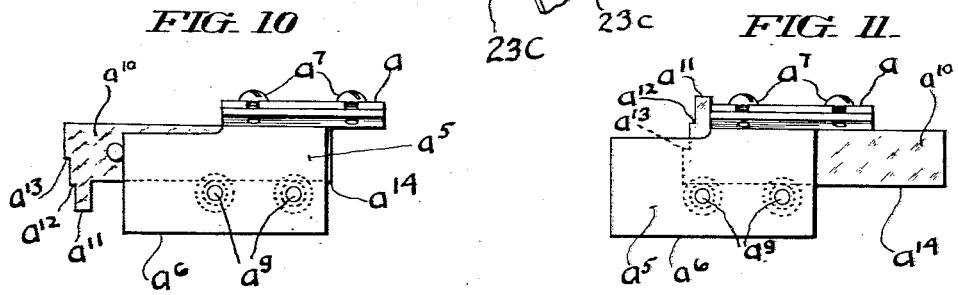
INVENTOR.
Thomas R. Harrison,
BY John E. Hubbell
ATTORNEY Feb. 6, 1934. T. R. HARRISON 1,946,280
CONTROL INSTRUMENT, APPARATUS AND METHOD
Filed Dec. 18, 1931 12 Sheets-Sheet 6

INVENTOR.
Thomas R. Harrison,
BY John E. Hubbell
ATTORNEY

Feb. 6, 1934. T. R. HARRISON 1,946,280
CONTROL INSTRUMENT, APPARATUS AND METHOD
Filed Dec. 18, 1931 12 Sheets-Sheet 8
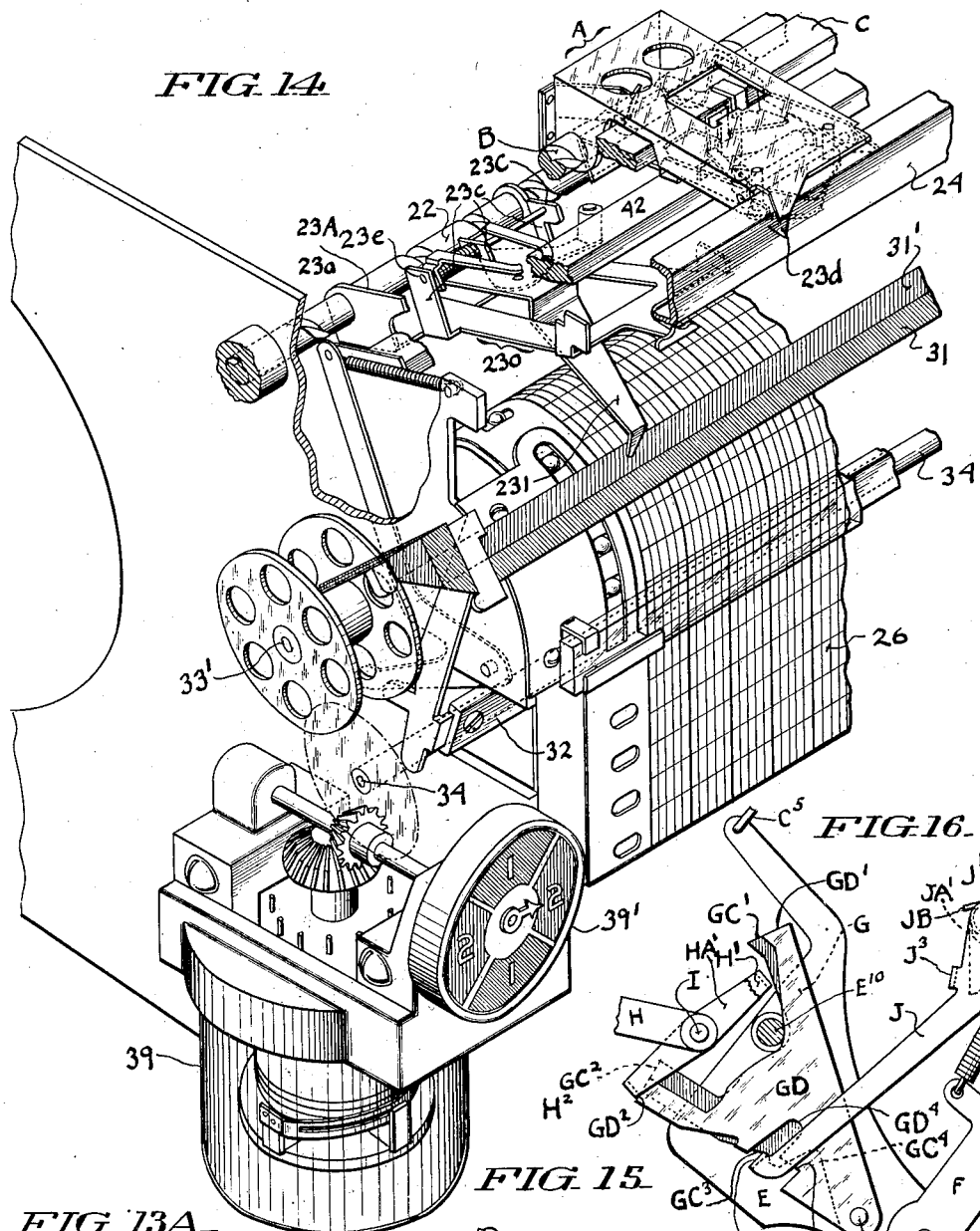
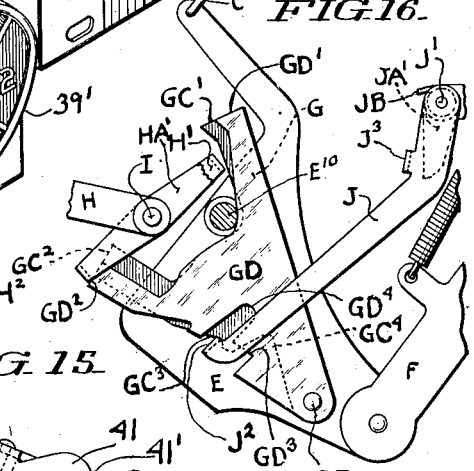
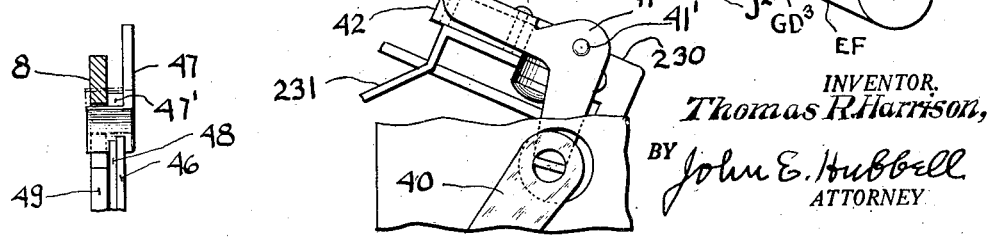
INVENTOR.
Thomas R. Harrison,
BY John E. Hubbell
ATTORNEY Feb. 6, 1934.  T. R. HARRISON  1,946,280
CONTROL INSTRUMENT, APPARATUS AND METHOD
Filed Dec. 18, 1931   12 Sheets-Sheet 9
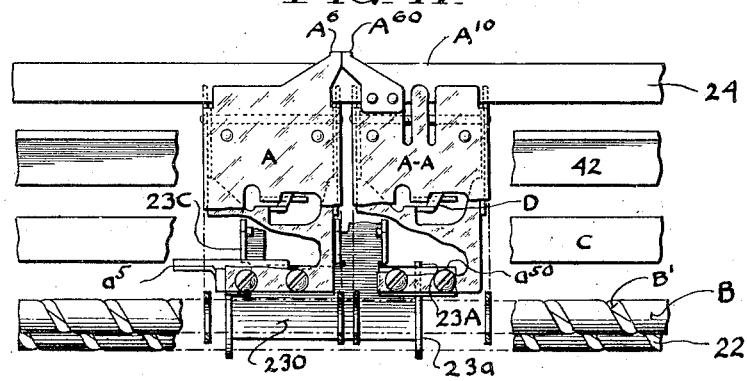
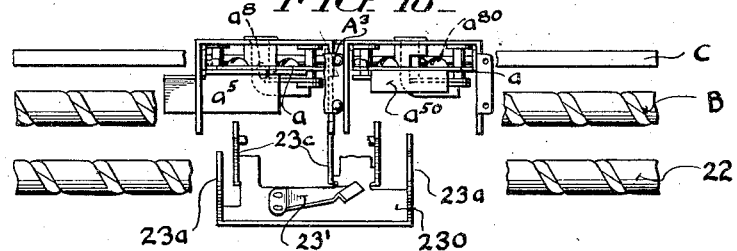
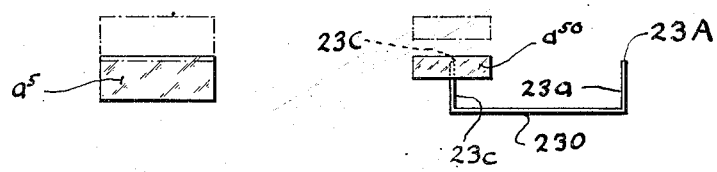
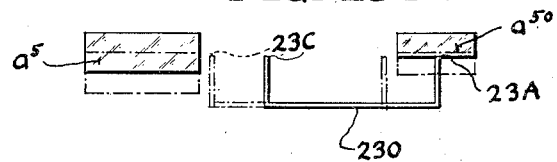
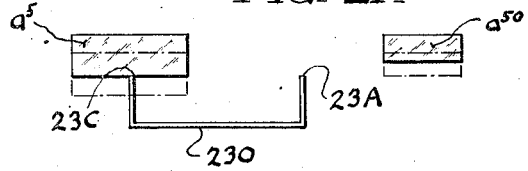
INVENTOR.
Thomas R. Harrison
BY John E. Hubbell
ATTORNEY

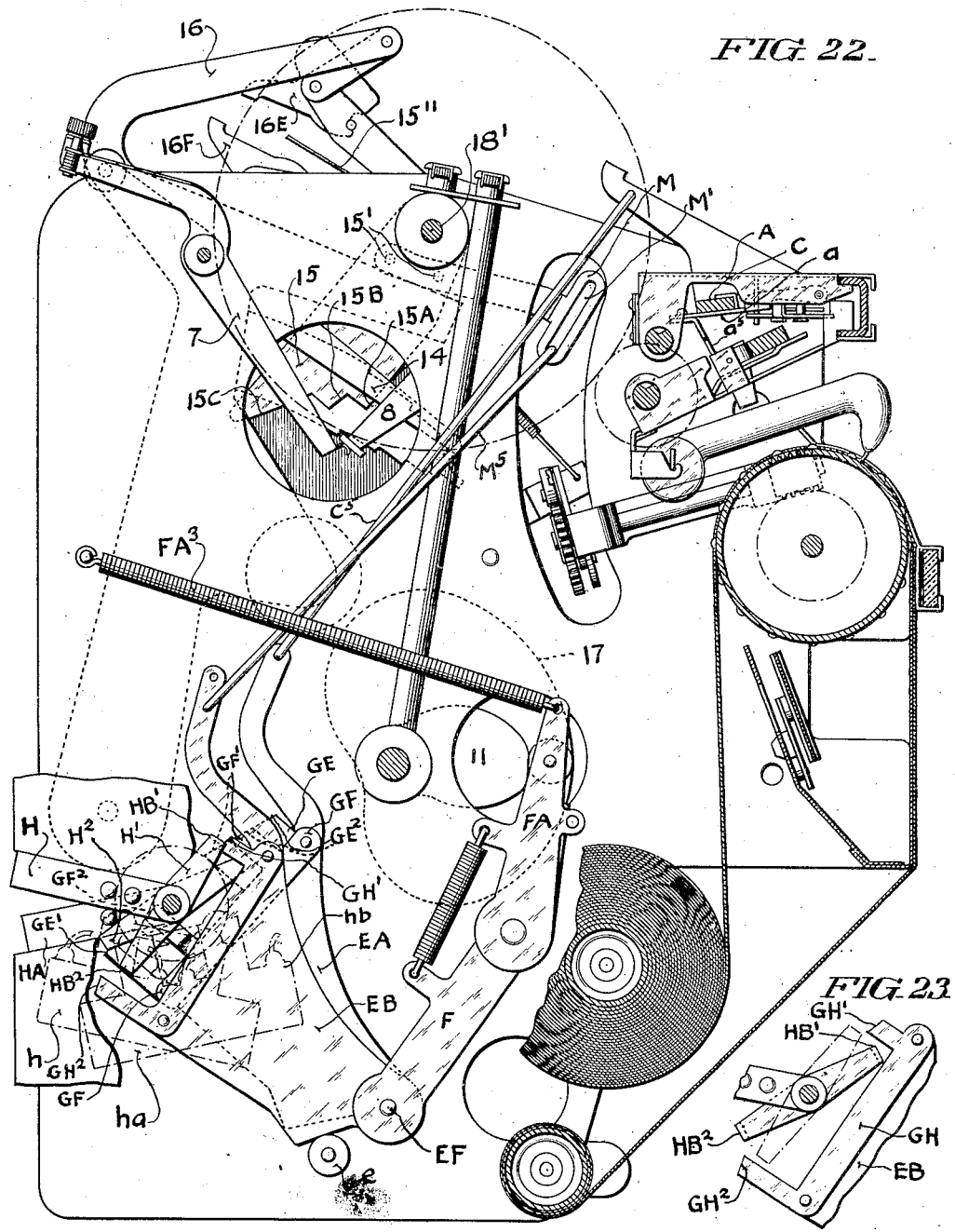

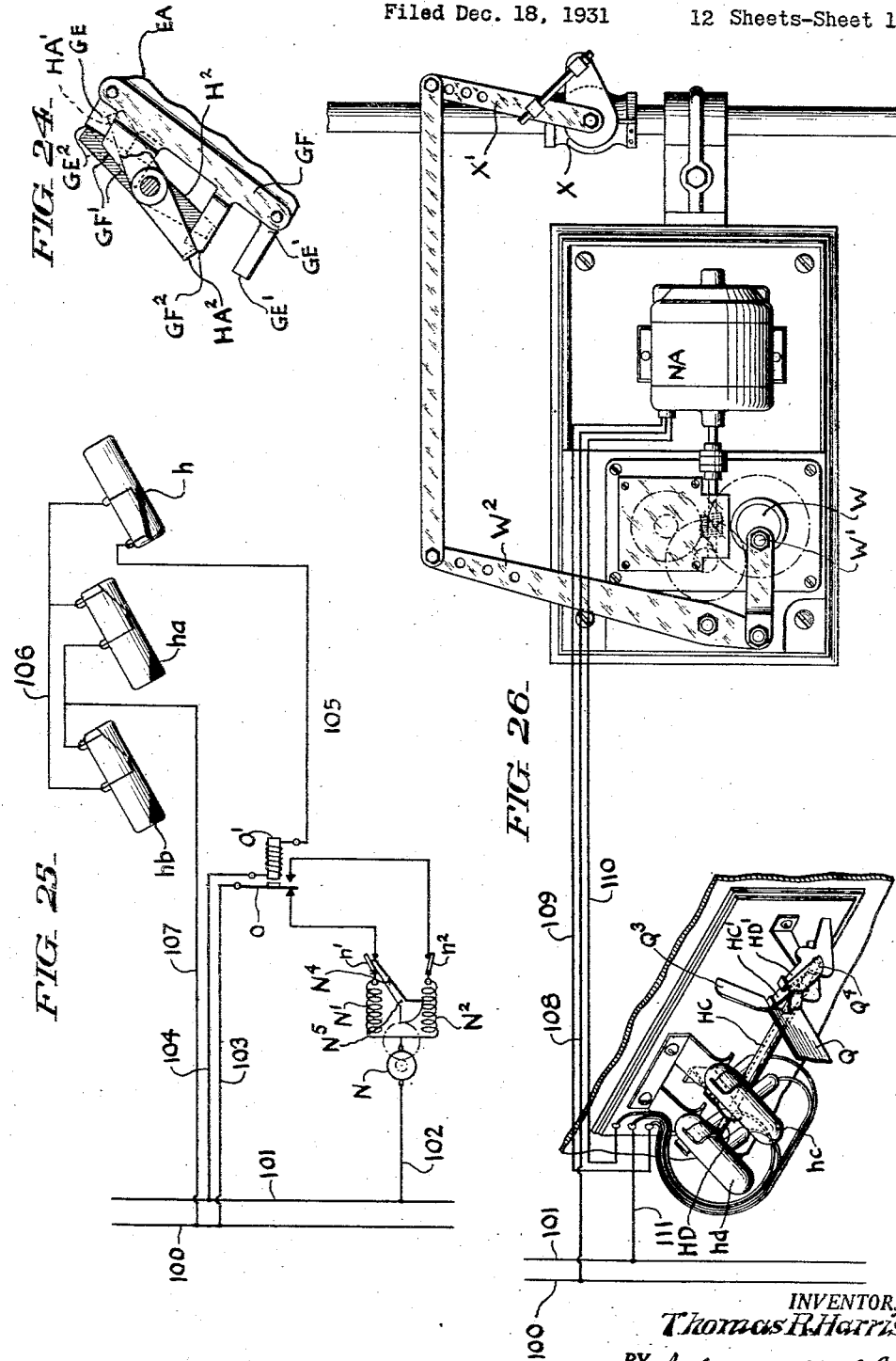

Feb. 6, 1934.  T. R. HARRISON  1,946,280
CONTROL INSTRUMENT, APPARATUS AND METHOD
Filed Dec. 18, 1931   12 Sheets-Sheet 12
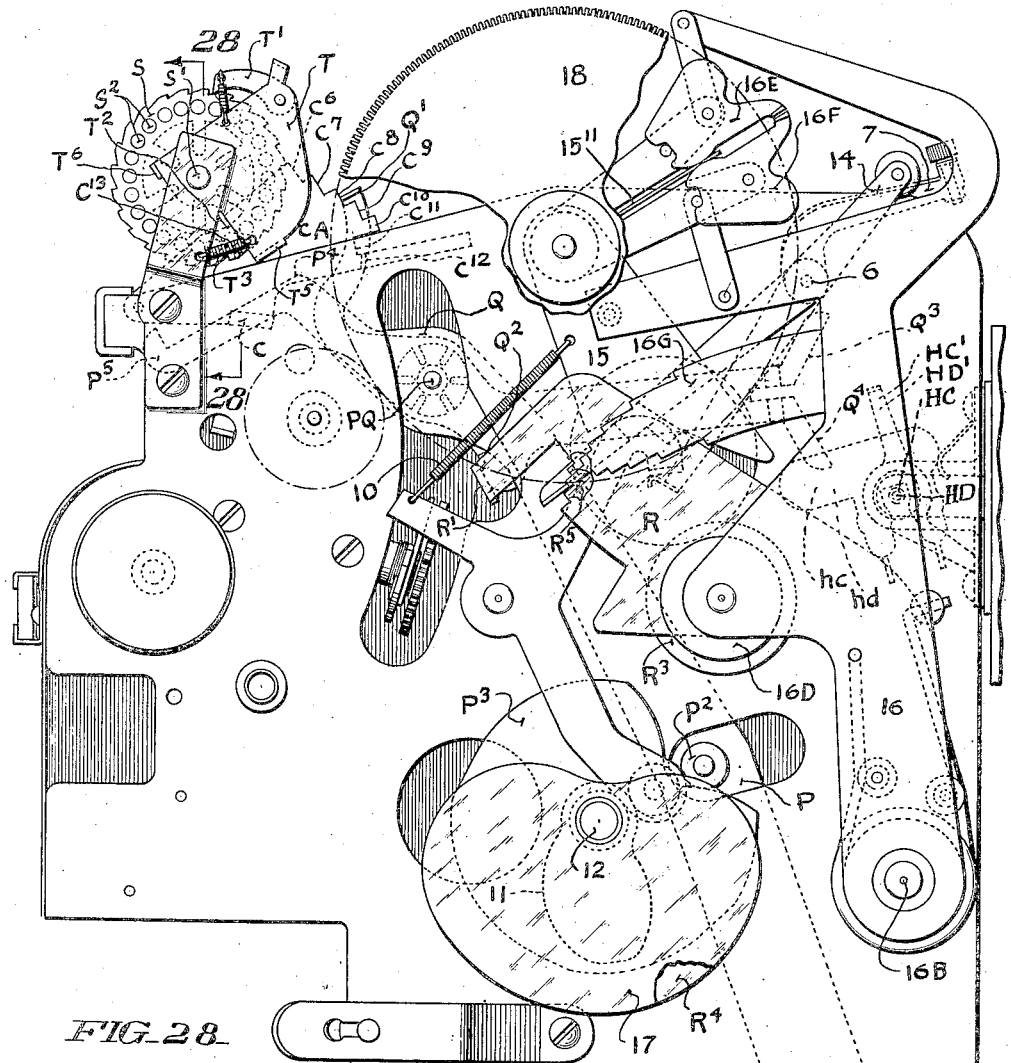
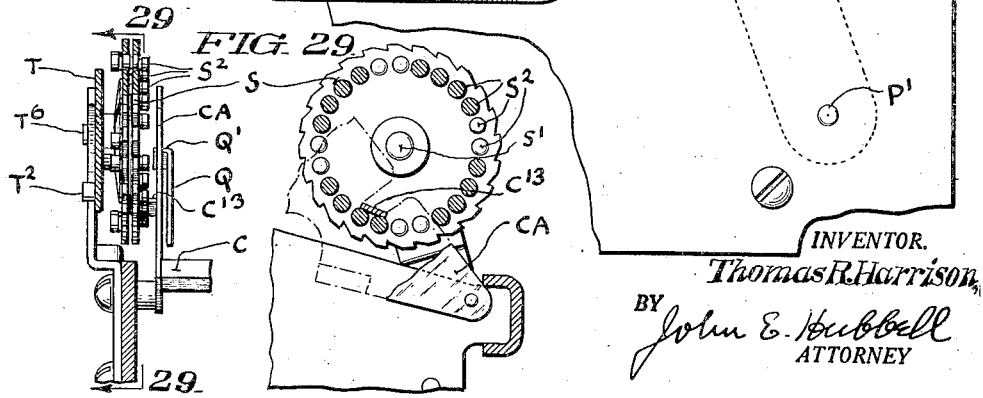
INVENTOR.
Thomas R. Harrison,
BY John E. Hubbell
ATTORNEY Patented Feb. 6, 1934

1,946,280

UNITED STATES PATENT OFFICE 1,946,280

CONTROL INSTRUMENT, APPARATUS AND METHOD

Thomas R. Harrison, Wyncote, Pa., assignor to The Brown Instrument Company, Philadelphia, Pa., a corporation of Pennsylvania Application December 18, 1931
Serial No. 581,932

93 Claims. (Cl. 236—15)

The present invention comprises improvements in control instruments of the type in which a deflecting galvanometer pointer or other element moving in response to changes in a variable condition controls a relay mechanism and thereby directly or indirectly actuates switches, valves or analogous devices through which control effects in suitable correspondence with deflections or movements of said pointer or element are produced. The invention also comprises improvements in control apparatus and method advantageously including and carried out with the aid of said control instrument improvements.

A main object of the present invention is to provide improvements in the construction, arrangement and mode of operation of control provisions which are adapted for general use in control instruments of the general type mentioned above, without regard to the specific character of the measuring mechanism included in such instruments.

Somewhat more specific objects of the present invention are to provide control provisions especially adapted for use in an existing type of recording potentiometer instrument comprising mechanical relay provisions for automatically effecting periodic potentiometer rebalancing and recorder adjustments, and to combine said control and relay provisions in a desirable manner.

The improvements constituting the present invention comprises numerous novel features of instrument construction and arrangement, are characterized in particular by their mechanical simplicity and effectiveness and by the relative ease with which they may be combined in various ways in potentiometer instruments, to adapt the latter for use under different conditions. My improvements are also especially characterized by the simple and effective manner in which the mechanical relay provisions employed in a potentiometer instrument, and to effect potentiometer rebalancing and recorder adjustments, are utilized in effecting control functions.

The present invention also comprises improvements especially devised and adapted for effecting in a desirable manner, an anticipatory control depending not only upon the direction, or direction and extent of departure of the measured quantity from its normal or desired value, but depending also upon the character of change occurring in that value at or immediately prior to the time at which each corrective control adjustment is made. Many features of the present invention may be used with advantage, however, in effecting a simple on and off control in response to the direction of departure of the measured or controlled quantity from its desired value.

Important practical and characteristic advantages of the present invention result from special features of construction and arrangement contributing to the compactness of the control instrument of which they form a part, and the relatively low inherent cost of manufacture of that instrument. In their preferred form, my improved control parts are for the most part in the form of sheet metal stampings so shaped as to permit their manufacture by a simple and relatively inexpensive manner sheet metal punching and binding operations.

As those skilled in the art will understand the quantity directly measured in a potentiometer instrument is an electric current or voltage, but the quantity directly measured may itself be a measure of one or another of many different physical quantities such as pressures, temperatures, velocities, vibration frequencies, space dimensions, etc. The control provisions herein provided may sometimes be used in regulating the quantity measured, as when the quantity measured is the voltage and thereby the temperature of a furnace thermo-couple, and the control provisions regulate the heat supply to the furnace as required to maintain said temperature constant. Said control provisions may also be used in some cases for purposes not involving any direct or automatic regulating effect on the quantity controlled, as, for example, in illuminating signal lamps in response to changes in some quantity such as a furnace temperature which may, or may not be manually adjusted as a result of the signal lamps illumination.

The various features of novelty which characterize the present invention are pointed out with particularity in the claims annexed to and forming a part of this specification. For a better understanding of the invention, however, its advantages and specific objects obtained with its use, reference should be had to the accompanying drawings and descriptive matter in which I have illustrated and described various embodiments of my present invention.

Fig. 2 is a perspective view of some of the operating parts of the instrument shown in Fig. 1, certain of the parts shown being relatively displaced to more clearly show their arrangement;

Fig. 3 is a perspective view of the control table of the instrument shown in Fig. 1;

Fig. 4 is a perspective view of a portion of the table shown in Fig. 3, with parts in different relative positions;

Fig. 5 is an elevation of the instrument as seen from the left of Fig. 1, with parts broken away in section;

Fig. 8 is a perspective view showing the control switch and switch actuating mechanism employed in the instrument shown in Figs. 1–7, and additional switches and switch actuating parts associated therewith;

Fig. 9 is a perspective view of a portion of the control table illustrating an arrangement of pen carriage engaging parts different from that shown in Figs. 1–7;

Figs. 10 and 11 are elevations showing different relative arrangements of parts shown in Fig. 9;

Fig. 13a is a section on the line A—A of Fig. 13;

Fig. 14 is a perspective view of a portion of the instrument shown in Figs. 12 and 13;

Fig. 15 is an elevation illustrating a detail of construction partly shown in Fig. 13;

Fig. 16 is an elevation of parts shown in different positions in Fig. 12;

Fig. 17 is a plan view with parts broken away and in section, illustrating the use of two control tables in such an instrument as is illustrated in Figs. 12–16;

Fig. 18 is a rear elevation of parts shown in Fig. 17;

Figs. 19, 20 and 21 are diagrammatic illustrations of parts shown in different positions in Figs. 17 and 18;

Fig. 22 is a view taken similarly to Fig. 5 and illustrating control provision modifications;

Figs. 23 and 24 are elevations of different switch actuating parts shown in different positions in Fig. 22; and Fig. 25 is a diagram of control circuits which may be used with the control apparatus shown in Fig. 22;

Fig. 26 is a partly diagrammatic illustration of control provisions usable with the instrument shown in Fig. 27;

Fig. 27 is an end elevation of another modification of the instrument shown in Figs. 1–7;

Fig. 28 is a partial section on the line 28—28 of Fig. 27; and

Fig. 29 is a section on the line 29—29 of Fig. 28.

Figure 1:
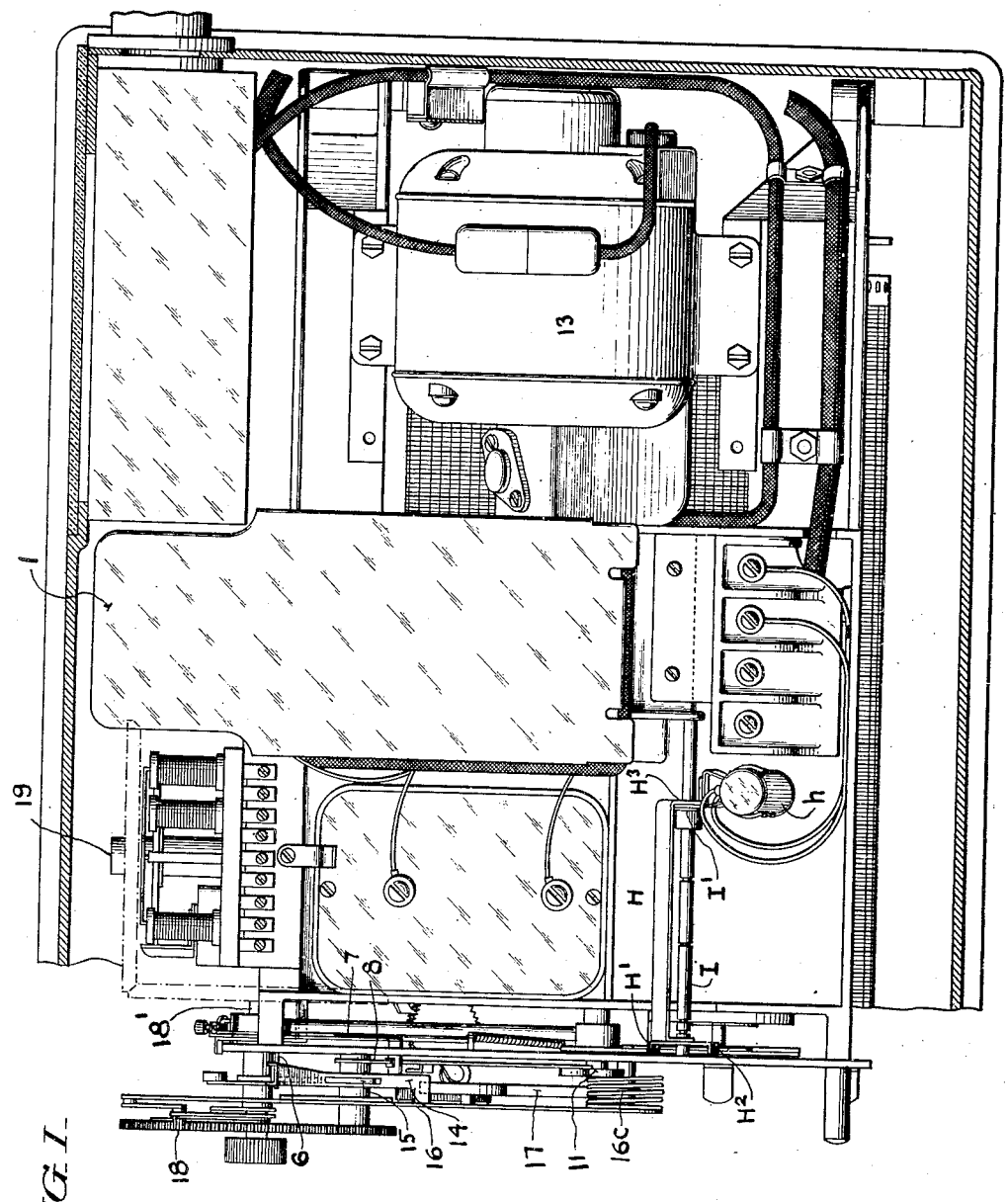
Fig. 1 is a rear elevation of an automatically rebalancing recording potentiometer instrument having automatic control provisions.

The recording potentiometer instrument shown in rear elevation in Fig. 1, and significant operative parts of which are illustrated in Figs. 2–7, includes a galvanometer 1, the pointer 2 of which deflects in response to a condition of unbalance in a potentiometer measuring circuit which may be of any usual or suitable form including a resistance which may be adjusted to rebalance the potentiometer. The instrument also comprises mechanical relay provisions operated by a constantly rotating driving motor 13 and controlled by the deflection of the galvanometer pointer 2 away from its normal zero position, which periodically rebalance the potentiometer circuit and move a pen or other recorder carriage 23 along a travelling record strip 26 to record the varying value of the quantity measured on said strip.

In respect to its recording potentiometer functions, the instrument shown in Figs. 1–7 is of the form disclosed in an application for patent, Serial No. 546,290, filed June 23, 1931, jointly by Ernest H. Grauel, Ernest Kessler and myself, and comprises numerous features of construction and arrangement invented by me and forming the subject matter of pending applications for patents filed by me.

The control provisions, which in their construction and arrangement, and in their combination with the above mentioned rebalancing and carriage adjusting mechanism, constitute the features of the present invention embodied in the instrument shown in Figs. 1–7, comprise a control table A and means by which one or more control switches are periodically actuated by said mechanism, when the recorder carriage 23 is displaced in one direction or the other from the control table. The control table A is normally stationary but may be manually adjusted along the path of movement of the carriage 23. The position of the control table along said path corresponds to, and determines the normal value of the quantity measured, while the position, at any instant, of the carriage 23 corresponds to, and constitutes a measure of, the current value of said quantity.

The mechanism of the instrument of Fig. 1 through which the deflection of the galvanometer pointer 2 controls the adjustments of the recorder carriage 23 and the rebalancing of the potentiometer circuit on a variation in the quantity or value measured by the galvanometer comprises a pointer engaging and position gauge element 3. The latter is pivotally supported and in connection with the hereinafter mentioned shaft 6 has a loading tendency, which may well be due partly to spring and partly to gravital action, to turn upward into the position in which one or another of the shoulders 5 of the member 3 engage the pointer 2. The element is engaged by, and turns, with the arm 6' of a rock shaft 6. A spring 10 tends to hold a rocker 8 which is journaled on a pivot 9, in the position in which the rocker engages an arm 7 secured to the shaft 6 and thereby holds the latter in a position in which the shoulders 5 are all below the pointer 2.

A cam 11 which is carried by a shaft 12 constantly rotated by the instrument driving motor 13 through a speed reduction gearing, turns the rocker 8 about its pivot against the action of the spring 10, once during each revolution. This allows the arm 7 to turn counter-clockwise, as seen in Fig. 2, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravital loading tendency to turn in the clockwise direction as seen in Fig. 2, so that the arm 14 normally bears against the projection 7' of the arm 7.

At the end of each angular adjustment of the secondary pointer 14 into a position corresponding to the then deflection of the galvanometer 2, one or another of the three shoulders 15A, 15B and 15C of a locking member 15, engages the bottom wall of a slot 14' in the member 14 and thereby frictionally holds the latter in the position occupied by it when such engagement occurs. When the pointers 2 and 14 occupy their neutral positions, the shoulder 15B of the member 15 comes into locking engagement with the member 14. When the galvanometer pointer 2 has deflected to the right as seen in Fig. 2, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring 16C gives the lever 16 a tendency to turn forward in the clockwise direction as seen in Fig. 2, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15 when in locking engagement with the secondary pointer 14, controls the action of the pawls 16E and 16F by virtue of the fact that a collar or hub portion 15''' of the part 15 carries a spring pawl engaging arm 15''. The movement of the locking part 15 into the position in which its shoulder 15A engages the secondary pointer 14 causes the arm 15'' to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15'' shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14 and thereby arrest the forward movement of the ratchet lever 16. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral position, the portion 14'' engages an upper or lower shoulder 16G' more or less distant from the central shoulder 16G and the lever 16 is then permitted more or less forward movement.

The rotation of the wheel 18 in one direction or the other effects corresponding potentiometer rebalancing adjustments and position adjustments of the recorder carriage 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustment made in response to a deflection of the galvanometer pointer in one direction away from its neutral position rebalances, or tends to rebalance, the potentiometer circuit and thereby returns, or tends to return, the galvanometer pointer to its neutral position. The details of the mechanism by which the rotation of the shaft 19 thus varies the resistance in the potentiometer circuit are fully disclosed in said prior application Serial No. 546,290, and need not be further described for that reason, as well as for the reason that such details form no part of the present invention.

The rotation of the wheel 18 adjusts the recorder carriage 23 by virtue of the fact that the teeth of the wheel 18 are in mesh with the teeth of a gear carried by a carriage adjusting shaft 22 which is in threaded engagement with the pen carriage. The shaft 22 is formed with a thread groove 22' of coarse pitch which receives a cam or mutilated screw thread rib 23' (see Fig. 18) secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 23a at the rear corners of said body portion transverse to, and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument.

The projections 23c support a small shaft 23e forming a support for a pen support 23f on which the pen 25 is pivotally supported with its marking end in engagement with a record sheet 26. The shaft 23c also supports parts cooperating with a bar 42 to effect adjustments of the pen support 23f which compensate for the expansion and contraction of the record sheet 26 caused by changes in atmospheric humidity. Such compensating provisions do not vary the position of the recorder carriage 23 though they vary the position of the pen or other marking element supported by said carriage, and form no part of the present invention and therefore need not be described herein.

The record sheet 26 passes over and is given feeding or advancing movements by a record feed roll 27. The latter is intermittently rotated by means of a worm and screw connection between the shaft of the roll 26 and a transverse shaft 28 carrying a ratchet wheel 29. The ratchet wheel 29 is engaged and moved by a ratchet lever 30 on each oscillation of the latter. The lever 30 is engaged and oscillated by the arm 8' of the rocker 8 on each oscillation of the latter.

Figure 7:
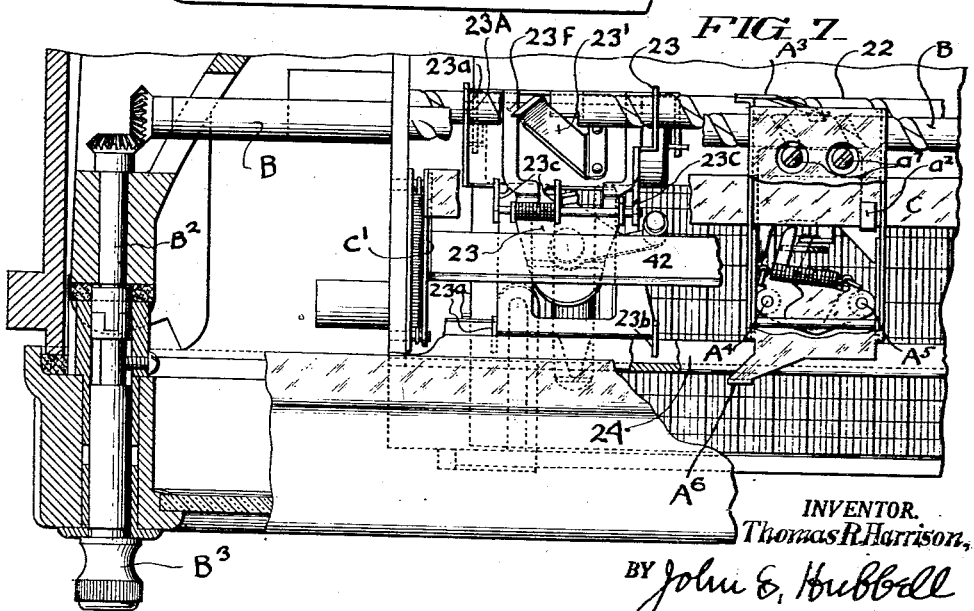
Fig. 7 is a plan view of a portion of the instrument of Fig. 1, with parts broken away and in section.

The control table A of the instrument shown in Fig. 1, comprises a sheet metal frame having ear portions A' apertured for the passage of a shaft B mounted in the instrument framework alongside the shaft 22 and having bearing parts $A^2$ which engage and slide along the upper flange of the rail 24. To facilitate the adjustment of the control table A along the path of travel of the pen carriage 23, the shaft B is shown as formed with a thread groove B' receiving a cam or mutilated thread rib part $A^3$ secured to the control table frame. The shaft B may be rotated to adjust the control table in any suitable manner as by means of the transverse shaft $B^2$ geared to the shaft B and rotated by an operating handle or knob $B^3$ at the front of the instrument as shown in Fig. 7. An index $A^6$ in conjunction with a scale on the front face of the rail 24 may indicate the adjustment of the table and the corresponding normal value of the quantity measured.

A member $a$ is hinged at one edge to the frame of the control table A by a pivot or pintele shaft $a'$ extending parallel to the shaft B. The member $a$ is formed with guiding provisions including a part $a^2$, for a bar-like part C which extends parallel to the shaft B and is rigidly secured at its ends to arms C' and $C^2$ which are pivotally connected to the instrument framework so that the yoke like structure formed by the bar C and arms C' and $C^2$ may turn with respect to the instrument framework about an axis coinciding with that of the hinge connection $a'$, between the table A and part $a$. The part $a$ and bar C are held by the said guiding provisions against independent turning movements about the axis of their respective pivotal supports. The part $a$ and bar C have a gravital tendency to move from their elevated positions, shown in dotted lines in Figs. 5 and 6, into or toward their lowermost positions, shown in full lines in Fig. 6. Their movement downward below their last mentioned positions is prevented by the engagement of a projection $C^3$ from the arm $C^2$ with an adjacent portion of the instrument framework. The parts $a$ and C are positively held in their uppermost positions by the action of a spring $FA^3$, except during the portion of each revolution of the shaft 12 when the cam 11 renders the spring $FA^3$ inoperative to prevent such movement, as is hereinafter described. The extent to which the parts $a$ and C are permitted to swing downwardly from their uppermost positions during each period when the action of the cam 11 renders the spring $FA^3$ temporarily inoperative, depends upon the then relative positions of the table A and the recorder carriage 23. When the value of the quantity measured is low enough so that the carriage 23 is entirely at the low side (left-hand side as seen in Fig. 2) of the control table A, the carriage 23 does not interfere with the movement of the parts $a$ and C into their lowermost positions.

Figure 6:
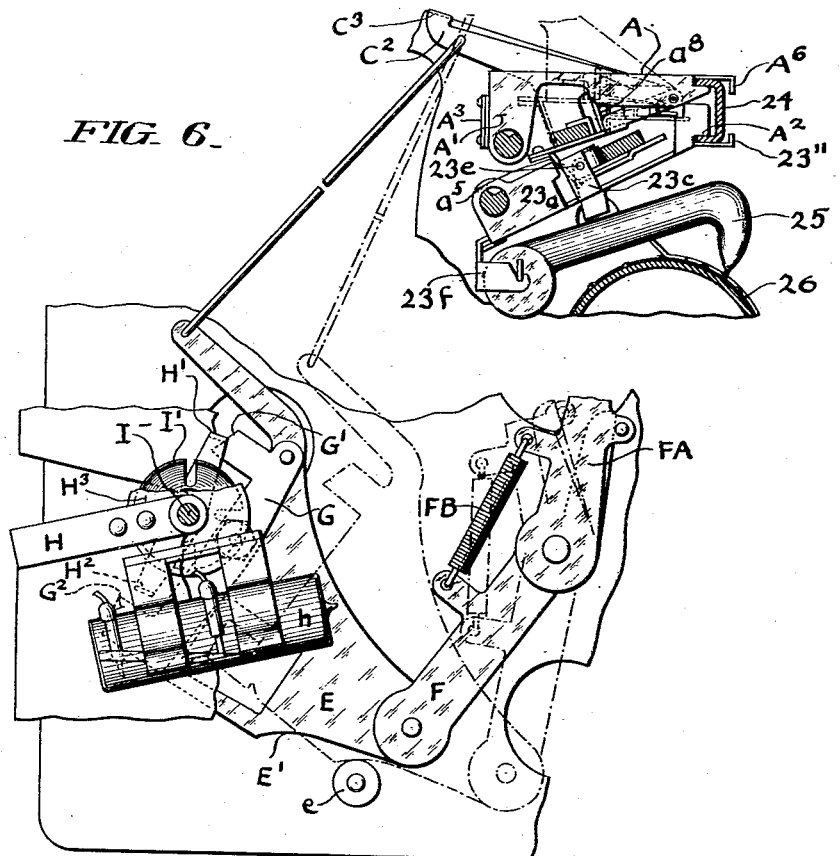
Fig. 6 is an elevation showing parts shown in Fig. 5 in different positions.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For the purpose of such engagement the part $a$, as shown in Figs. 3, 5 and 6, has a carriage engaging portion $a^5$ detachably secured to it. The part $a^5$ is in the form of a plate with a downwardly projecting body portion terminating in a lower horizontal edge $a^6$, and having at its upper edge a lateral flange portion bearing against the underside of the part $a$ at the rear edge of the latter and detachably secured thereto by clamping screws $a^7$. The bodies of said screws pass through slots in the part $a$ which are open at the rear edge of the latter.

The lower edge $a^6$ of the projection $a^5$ is so disposed that it may engage and rest upon the shoulder 23C formed by the upper edge of the projection 23c at the high side of the recorder carriage 23 (the righthand side as seen in Fig. 7), when the position of said carriage is such as to hold the shoulder 23C beneath said edge $a^6$. In the condition just described the control table part $a$ cannot move downward below the position shown in full lines in Fig. 5, which is the upper operating position of the part $a$. The movements of the part $a$ between the position shown in full lines in Fig. 5 and the uppermost position shown in dotted lines in Fig. 5, are inoperative movements insofar as the actuation of the control devices is concerned. The uppermost position of the part $a$ shown in dotted lines in Fig. 5 may be called a clearance position as part $a$ in that position cannot interfere in any way with the movements of the marker carriage, all of which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting a latch member D, into its latching position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A5$ depending from the underside of the control table frame alongside the stud $A^4$, and a spring $Dd$ connecting the members D and $d$. The spring $Dd$ tends to move the member D in the counter-clockwise direction as seen in Figs. 3 and 4, and to move the member $d$ in the opposite direction about their respective pivotal supports A⁴ and A⁵. Such turning movements of the members D and d are prevented by the engagement of the finger portion d' of the part d with the shoulder D' of the member D, when the latter is in its latching position as shown in Fig. 3. In the non-latching position of the member D, the finger d' engages a shoulder D² of the part D as shown in Fig. 4.

The members D and d are moved from the position shown in Fig. 3 into that shown in Fig. 4 and back again into the position shown in Fig. 3 by the engagement of the recorder carriage shoulder 23B with the cam shaped front edges D⁵ and d⁵ of the members D and d, respectively. The edges D⁵ and d⁵ are so respectively shaped and disposed that as the carriage moves to the high side of the control table, the shoulder 23B acts on the edge d⁵ to turn the member d counter-clockwise as seen in Figs. 3 and 4, so that the spring Dd may then move the member D into its latching position in which its shoulders D' engages the finger d'. When the carriage 23 subsequently moves back from its high position, the shoulder 23B engages edges D⁵ of the member D and moves the latter into its non-latching position while permitting the spring Dd to move the member d into the position in which its finger d' engages the shoulder D² of the member D, and holds the latter in its non-latching position.

The means through which the spring FA³ normally prevents movement of the control table part a out of its clearance position, and through which the rising and falling movements of the bar C and part a effect control functions, include a floating member E connected by a link C⁵ to the arm C², and parts associated with the member E. The latter is pivotally connected at EF to the part F of a compound lever comprising parts F and FA each pivoted to the instrument framework at F' and normally held against relative movement by a spring FB. The latter tends to hold the part F in engagement with a projection FA' of the part FA, but serves as a safety device which may yield to prevent injury of the parts in case the switch parts actuated by the member should jam. The spring FA³ extends between the upper end of the lever part FA and the instrument framework, and tends to hold the parts F, FA and E in the positions shown in dotted lines in Fig. 5. The lever part FA is moved from the dotted line position into the full line position of Fig. 5 once during each rotation of the shaft 12, by the cam 11, which then engages a cam roll follower FA² carried by the lever part FA.

When the parts are in the positions shown in dotted lines in Fig. 5, the lower cam edge E' of the member rests upon a roller support e mounted on the instrument framework, and the position of the member E is then such that the link C⁵ holds the part C² and thereby the bar C and control table part a in their uppermost positions. When the lever part F is turned in the clockwise direction from its Fig. 5 dotted line position, the weight of the part E adds to the gravital tendency of the bar C and table part a to turn downward, and the parts last mentioned then move downward into the position shown in full lines in Fig. 5, unless such movement is prevented by the control table latch D, or by the engagement of the edge a⁵ with the recorder carriage shoulder 23C.

The movement of the member E into the full line position shown in Fig. 6 moves a control switch h into its closed position, unless the switch is already in that position, by turning the switch supporting frame H about its stationary supporting shaft I. The frame H is so turned by the engagement of a projection G' carried by the member E with an arm H' carried by the frame H. When the member E moves into the position shown in full lines in Fig. 5, a projection G² carried by the member E engages an arm H² carried by the frame H and turns the latter to move the switch h into its open position if not already in that position. The projections G' and G² are formed by the leg portions of a yoke-shaped piece G of sheet metal detachably secured to the member E.

The switch h as shown is a mercury switch comprising a container with terminals h' and h² extending into the container adjacent one of its ends. The terminals h' and h² are or are not connected by a body of mercury within the container, accordingly as the position of the latter is such as to hold the mercury at one end or the other of the container. The switch h is clamped to its supporting member H which is of yoke form and has its ends pivotally mounted on a stationary shaft I. The latter carries a friction disc I' cooperating with a friction disc H³ carried by the frame H to frictionally hold the frame H in any position into which it is adjusted.

The case with which it may be modified to adopt it for use under different operating conditions is a desirable characteristic of the instrument shown in Figs. 1-7. For example, the instrument may readily be provided with one or more control switches in addition to the switch h, and in Fig. 8 two such additional switches, ha and hb are shown. The switches ha and hb of Fig. 8 are carried by switch supporting frames HA and HB respectively mounted on the same shaft I on which frame H is mounted. The frames HA and HB are each essentially similar in form to the frame H, except that their dimensions are reduced to permit the frame HA to work within the frame H, and to permit the frame HB to work within the frame HA. The switch frame HA is tilted into its switch closed and switch open positions in accordance with the positions of the control table part a and member E when the latter is given its switch actuating movements, by a member GA detachably connected to the member E and having shoulders GA' and GA² adapted to engage the arms HA' and HA², respectively, of the frame HA, when the positions of the control table part a and the member E permit such engagement. Similarly the switch frame HB is adjusted into its closed and opened positions by a member GB detachably connected to the member E and having shoulders GB' and GB² respectively engaging the arms HB' and HB² of the switch frame HB when the positions of the control table part a and member E are suitable to effect such engagements. As shown in Fig. 8 the switch supporting frames HA and HB are provided with friction discs HA³ and HB³, respectively cooperating with friction discs IA' and IB' secured to the non-rotatable shaft I. The latter forms the pivotal support for the frames HA and HB as well as for the frame H and is anchored in the instrument framework.

By suitable proportioning the lengths and relative disposition of the various shoulders G', G², GA', GA², GB' and GB², the various switches h, ha and hb may be respectively adjusted into their opened and closed positions in various sequences, according to the character of the control system in which the switches are employed, by successive switch actuating movements of the member E turning with the control table part $a$ in different positions. The extent of down movement permitted the control table part $a$ in different relative positions of the control table A and recorder carriage 23 may obviously be varied by varying the shape of the portion or portions of the control table part $a$ then engaging the carriage shoulder 23A. For example, as shown in Fig. 9, the control table part $a$ may have attached to it not only the part $a^5$ previously mentioned, but also, a second part $a^{10}$, the latter being formed with shoulders $a^{11}$, $a^{12}$ and $a^{13}$ located at the high end of the edge $a^6$ of the part $a^5$, and at progressively increasing distances above the level of the shoulder or bottom edge $a^6$ of the part $a^5$. Which of the shoulders $a^6$, $a^{11}$, $a^{12}$ and $a^{13}$ may engage the recorder carriage shoulder 23C at any time depends on the position at the time of the carriage 23 relative to the control table A.

As shown the part $a^{10}$ comprises a bar-like shank which is held in place against the front side of the part $a^5$ with its upper edge bearing against the underside of the part $a$ by the heads of clamping pins $a^9$ carried by the part $a^5$. The lower edge of the shank of the part $a^{10}$ rests upon the bodies of the pins $a^9$ and easy and accurate assemblage of the parts is facilitated by the fact that the part $a^5$ is inclined forwardly from the position which it would occupy if it extended perpendicularly away from the part $a$, so that the tightening up of the clamping screws $a^7$ binds the shank of the part $a^{10}$ between the part $a$ and the bodies of the pins $a^9$ and holds the part $a^{10}$ snugly in place against the part $a^5$.

In Fig. 10, the part $a^{10}$ is reversed so that the end of the shank portion forms a single short shoulder above the shoulder $a^6$. The arrangement shown in Fig. 11 differs from that shown in Fig. 10 merely in that the part $a^{10}$ is moved further to the right relative to the part $a^5$ thus elongating the shoulder $a^{14}$. The horizontal elongation of the shoulder $a^{14}$ serves to increase the extent of variation in the quantity measured which can occur while the marker carriage shoulder 23C remains effective to engage the shoulder $a^{14}$ and correspondingly restrict the down movement of the part $a$. In the arrangement shown in Figs. 10 and 11 the shoulders $a^{11}$, $a^{12}$ and $a^{13}$ of the part $a^{10}$ are functionless.

A control table A having such recorder carriage engaging provisions as are shown in Fig. 9, may be used in conjunction with the control switch circuit arrangements shown in Fig. 8 to energize one or more of the three differently colored signal lamps, $hg$, $hw$ and $hr$ in accordance with the changes in value of the measured quantity which permit downward movements of the control table $a$ into different positions. In Fig. 8 the signal light $hg$, which may be a green lamp, is connected between a supply conductor 100 and the terminal $h'$ of the switch $h$; the lamp $hw$, which may be a white lamp, is connected between the supply conductor 100 and the terminal $h'$ of the switch $ha$; and the lamp $hr$, which may be a red lamp, is connected between the supply conductor 100 and the terminal $h'$ of the switch $hb$. The terminals $h^2$ of each of the three switches is connected to the supply conductor 101.

With the various switch engaging shoulders $G'$, $G^2$, $GA'$, etc. of proper lengths and suitably disposed, the apparatus collectively shown in Figs. 8 and 9 will operate to open and close the switches and energize and deenergize the lamps as follows. When the control table shoulder $a^6$ is at the low side of the recorder carriage shoulder 23C and the part $a$ occupies its lowermost operative position, the switch $h$ will then be the only closed switch and only the green lamp $hg$ will then be energized. When the control table shoulder $a^{13}$ engages the shoulder 23C, switches $h$ and $ha$ will both be closed and the white lamp $hw$ as well as the green lamp $hg$ will be energized. When the shoulder $a^{12}$ engages the shoulder 23C, the switch $ha$ will remain closed, but the switch $h$ will open so that then only the lamp $hw$ will then be energized. When the shoulder $a^{11}$ engages the shoulder 23C the switch $ha$ will remain closed, and the switch $hb$ will be closed, the condition shown in Fig. 8, so that both lamps $hw$ and $hr$ will then be energized. Finally when the shoulder $a^6$ engages the shoulder 23C and control table part $a$ is in its uppermost operating position, the switch $ha$ will be open while the switch $hb$ will remain closed so that then only the red lamp $hr$ is illuminated.

The previously mentioned prior application Serial No. 546,290 discloses how by relatively simple changes and additions an instrument having the potentiometer rebalancing and recording features of the instrument of Fig. 1, hereof, may be adapted to make separate records of the varying values of a plurality of quantities such as the voltages of thermocouples separately connected to the potentiometer in regularly recurring sequences. In Figs. 12, 13, 14, 15 and 16, I have illustrated the nature and character of such changes in, and additions to the instrument of Fig. 1, and illustrate the combination therewith of control provisions for effecting adjustments of one control device or set of control devices in accordance with the varying values of one quantity measured and for effecting separate adjustments of another control device, or set of control devices, in response to variations in the value of another quantity measured. The control provisions of the instrument shown in Figs. 12-16, comprises a member E which may be identical with that of Fig. 5 both in its form and in the manner in which the associated parts C and F are given their movements as a result of the action of the cam 11 and of the movement given to the hinged part $a$ of the control table A. The control switch mechanism employed in Fig. 12 comprises two switches $h$ and $ha$ supported by frames H and HA, respectively, as illustrated in Fig. 8. The position of the switch $h$ is controlled by a switch actuating member GC mounted on the member E and provided with one shoulder GC' adapted to cooperate with the frame arm H' in moving the switch $h$ into its closed position and another shoulder GC² adapted to cooperate with the switch frame arm H² to move the switch $h$ into its open position. Also mounted on the member E is a switch actuating member GD having shoulders GD' and GD² adapted to respectively engage the switch frame arms HA' and HA² and thereby close and open the switch $ha$.

Figure 12:
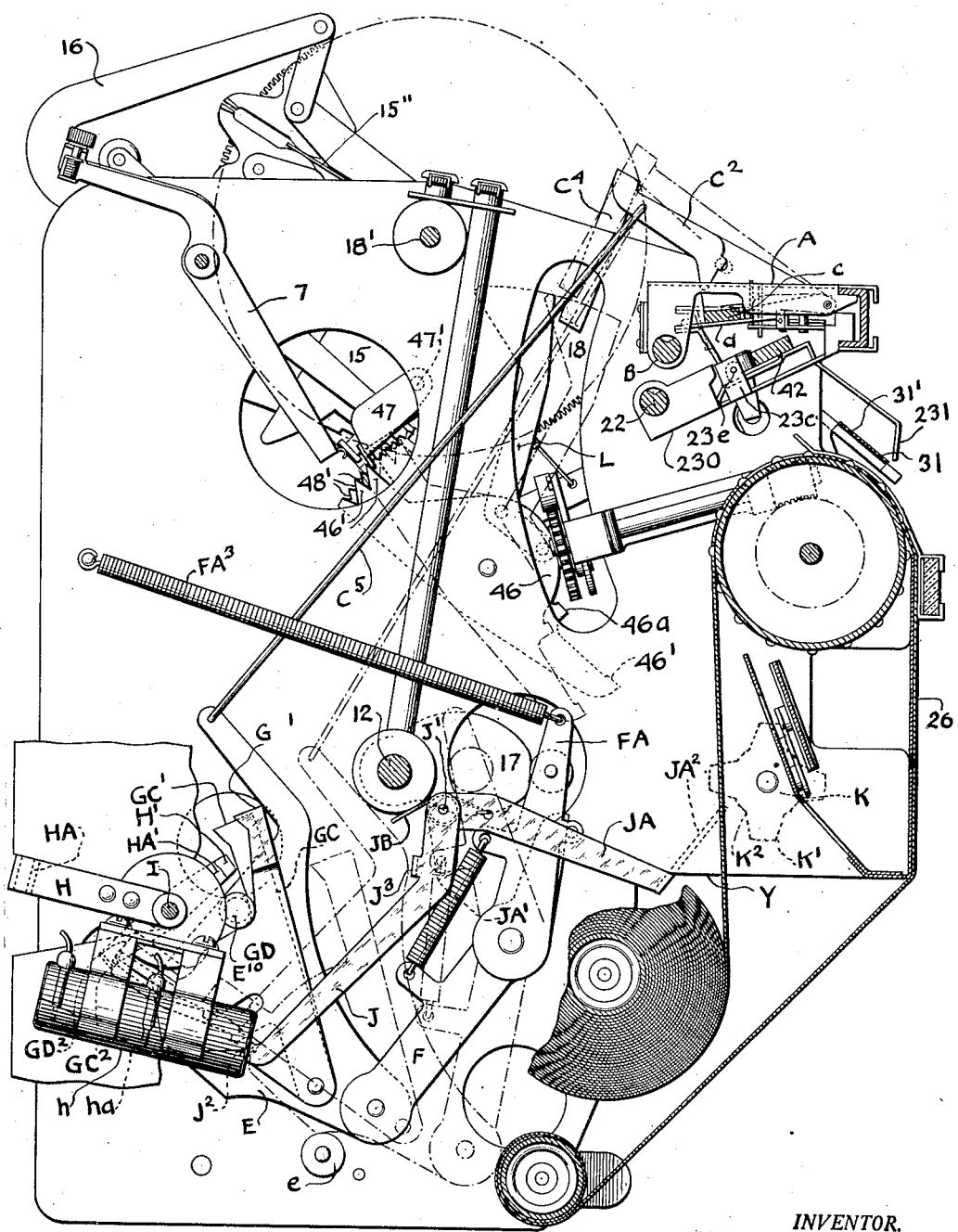
Fig. 12 is a view taken similarly to Fig. 5 illustrating a modification of the instrument of Figs. 1–7.

The two members GC and GD are pivotally connected to the member E by the same pivot pin and each tends to move under the action of gravity into an operative position in which it bears against the body of a headed pin $E^{10}$ carried by the member E. On each switch actuating stroke of the latter, however, one or the other of the members GD and GC is held by an arm J in the inoperative position occupied by the member GC in Fig. 16. In that position of the member GC, the shoulders GC' and GC² are elvated so that they cannot engage the switch frame arms H' and $H^2$ in any operative position of the member E. Similarly, when the arm J holds the member GD in its inoperative position, as shown in Fig. 12, the shoulders GD' and $GD^2$ cannot engage the switch frame arms HA' and $HA^2$.

The arm J, which is pivotally supported by a pivot pin J', acts on the members GC and GD through a lateral projection $J^2$ which engages a shoulder $GC^3$ of the member GC to hold that member in its inoperative position, and engages a shoulder $GD^3$ of the member GD to hold the latter in its inoperative position. The members GC and GD are cut away at $GC^4$ and $GD^4$, respectively, so that when the projection $J^2$ engages the shoulder $GC^3$, there is ample clearance between it and the member GD, and similar clearance between the member GC and projection $J^2$ when the latter is in engagement with the shoulder $GD^3$.

As is clearly shown in Fig. 16, the shoulder $GD^3$ is closer to the pivot pin EF than is the shoulder $GC^3$, and whether the projection $J^2$ holds the member GC or GD in its inoperative position during any switch actuating movement of the member E, depends upon the angular position of the member J at the stage of said movement at which the cam roll e allows down movement of the member E sufficient to bring one or the other of the shoulders $GC^3$ and $GD^3$ into engagement with the projection $J^2$. The angular position of the arm J at that time depends upon the angular position of a second arm JA pivoted on the pivot pin J'. The arm J has a gravital tendency to turn when free to do so into a position in which its projection $J^3$ bears against an extension JA' of the arm JA. The angular position of the arm JA at any time depends upon whether an extension $JA^2$ of that arm engages the end of one or another of the teeth K' of a star wheel K or enters one or another of the valleys $K^2$ between the teeth K' and comes to rest against the frame member Y. A spring JB holds the extension $JA^2$ of the arm JA in contact with a tooth of the star wheel K or with the member Y at all times.

In the particular construction shown, the star wheel K has four teeth K' and four valleys $K^2$ and is turned one-eighth of a revolution on each adjustment of the potentiometer to include one and exclude the other of two thermocouples or other sources of electromotive force alternately connected to the potentiometer. The member GC is held in its inoperative position by the arm J while the voltage of one source is being recorded and a corresponding control function, if needed, is being exercised through the device GD, and when the voltage of the other source is being recorded and the corresponding control function, if needed, is being exercised through the member GC, the member GD is held in its inoperative position by the arm J. The arm J moves away from and back into engagement with the projection JA' during the forward and return movements of the part E occurring after the projection $J^2$ has engaged one or the other of the shoulders $GC^3$ and $GD^3$.

The special control features illustrated in Figs. 12 to 16 may be used in some cases when the normal values of the quantities measured are the same, and in other cases when the normal values of the quantities measured are different. In the use of the apparatus of Figs. 12 to 16, for example, in controlling the furnace heating effects of two similar furnaces operating under similar conditions and having their respective effects measured by means of similar thermocouples, the normal thermocouple voltage would be the same for each furnace, and the same departure in that voltage from its normal value should result in the same compensating control adjustment in the case of each furnace. For the attainment of such similar control effects the control table part a of Fig. 12 need have but two operative positions, so that the member GC or GD will open or close the switch h or ha, respectively, when the corresponding furnace thermocouple voltage is not less than, or is below the normal value.

When the normal values of the quantities measured are different, the control table parts a of Figs. 12 to 16 are preferably arranged to have more than two operative positions, as is explained hereinafter following the explanation now to be given of the provisions shown in Figs. 12 to 16 for delaying the control and recording operations until a suitable plurality of rebalancing operations have been made. In an automatically rebalancing recording potentiometer, and particularly in such a potentiometer adapted and employed to measure in regularly recurring sequences the varying values of different quantities, there are advantages in providing for a sufficient plurality of rebalancing operations in measuring each quantity to afford substantial opportunity for obtaining approximately perfect balance, before effecting a compensating control adjustment or actually making a record of the measurement.

The provisions for so delaying the control and recording apparatus shown in Figs. 12-16 include a part 46 and a member L secured to the part 46. The latter occupies one position at the beginning of each measuring operation and prevents a recording operation until two or more rebalancing operations have been effected and have resulted in the adjustment of the member 46 from its initial position into a final or recording position shown in full lines in Fig. 12 and 13.

The member L which shares the movements of the part 46, permits a control operation to be effected only when it is in the full line position shown in Fig. 12, and the member 46 in the position in which the recording operation can be performed. The member L occupies the position shown in dotted lines in Fig. 12 at the beginning of each measuring operation. While the member L is in its dotted line position and until it has moved suitably close to its full line position, it prevents control adjustment by virtue of the fact that its upper end is then in the path of down movement of an extension $C^4$ of the arm $C^2$. The member L while in the path of movement of the extension $C^4$ prevents down movement of the control table part a into its uppermost switch actuating condition.

The recorder carriage 230 employed in the instrument illustrated in Figs. 12-16 differs from the recorder carriage 23 first described, only in that the marking element of the carriage 230 is a hammer member 231 pivoted on carriage shaft 23e and replacing both the pen 25 and the pen support 23f of the carriage 23. The hammer member 231 is oscillated on the shaft 23e from time to time to make a record impression on the record sheet 26 by pressing one or the other of the two differently colored sections 31 and 31' of a transfer ribbon against the record sheet 26. The transfer ribbon is carried by a ribbon supporting frame 32 comprising end members pivoted on studs 33 and 33' carried at the opposite ends of the instrument framework. Associated with the ribbon supporting frame 32 are suitable ribbon guiding and feeding provisions which require no explanation herein.

Figure 13:
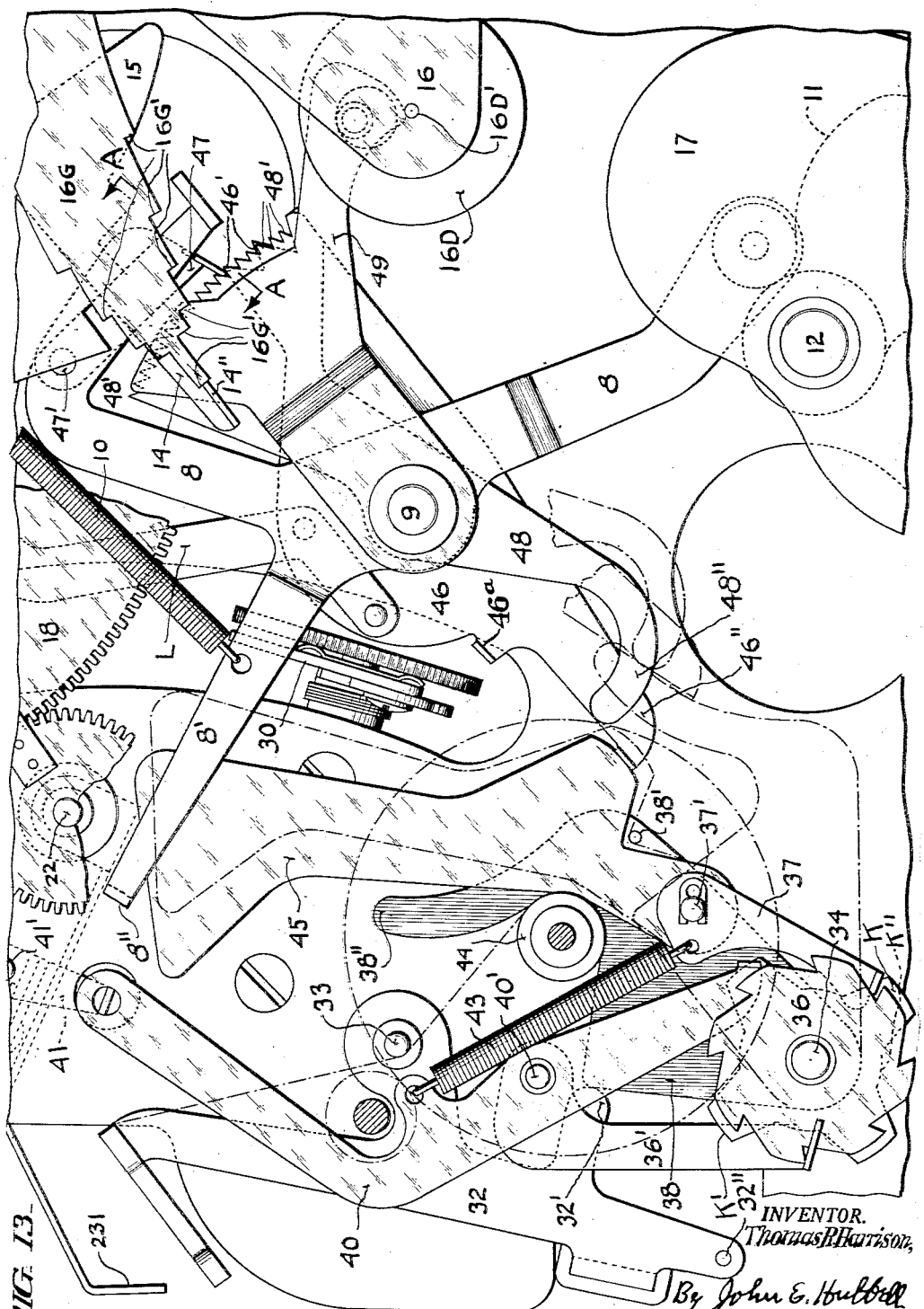
Fig. 13 is an elevation of a portion of the instrument shown in Fig. 12 taken at an angle of 180° to Fig. 12, and with parts broken away and in section.

Normally the ribbon supporting frame 32 is held in a retracted position in which it does not interfere with visual inspection of the record by a ratchet lever 38 bearing against a projection 32' from the frame. When the lever is retracted the frame 32 turns counter clockwise, as seen in Fig. 13, under the action of gravity until its movement is arrested by the engagement of a projection 32" from the frame 32 against the star wheel K. Section 31 or section 31' of the transfer ribbon will then be in the recording position, accordingly as the projection 32" engages a tooth K' or enters a tooth notch or valley K" of the star wheel K. The star wheel K is carried by a shaft 34. The latter is rotated by means of a ratchet wheel 36 secured to the shaft, a co-operating pawl 37 carried by the above mentioned ratchet lever 38, and mechanism hereinafter described for actuating said lever. A pawl 36' prevents retrograde rotation of the wheel 36.

The shaft 34 by its intermittent rotation not only advances the ribbon supporting frame 32 when a record is to be made, but is also geared to, and operates a switch mechanism 39, shown in Fig. 14, employed to alternately connect the potentiometer circuit to one or the other of the two thermo-couples or other sources of current or voltage to be alternately measured. The details of the switch mechanism 39 including the switch position indicator 39' need not be described as they form no part of the present invention and moreover may be, and as shown moreover are of the type disclosed in my prior Patent 1,770,918, granted July 22, 1930.

The rotation of the ratchet wheel 36 oscillates the recording hammer 231 through a lever 40 pivoted at 40' and having one end riding on the toothed periphery of the wheel 36 and having its other end connected to one arm of a bell crank lever 41 pivoted at 41'. The second arm of lever 41 is connected to a bar 42. When the lever 40 drops off a tooth of wheel 36 and then rides up on a following tooth the bar 42 is moved down and up, and gives corresponding movements to the hammer 231 which is in sliding engagement with said bar. A spring 43 connecting the pawl 37 and lever 40 gives the latter a snap action as it drops off each tooth of wheel 36 and thus contributes to sharp record impressions. The spring 43 also holds the pawl 37 against the periphery of the wheel 36 and normally holds the ratchet lever 38 in its uppermost position in which it bears against a fixed stop 44.

The ratchet lever 38 is turned clockwise from the position shown in Fig. 13 about the shaft 34 to advance the wheel 36 one tooth (i. e. one-eighth of a revolution) on each oscillation of the rocker 8 in the counter-clockwise direction which occurs at a time in which the previously mentioned lever 46 holds a thrust member 45 in the full line position shown in Fig. 13 in which said member bears against a stop 44. In that position the member 45, which is pivoted on the pivot pin 37' connecting the pawl 37 to the ratchet lever 38, acts as a thrust block interposed between the pivot pin 37' and the projection 8" at the end of the arm 8' of the rocker 8. The turning movement about the shaft 34 then given the lever 38 as the projection 8" descends, carries the arm 38" of the lever 38 into the position shown in dotted lines in Fig. 13, and in turning into its dotted line position the arm 38" engages the lower end 46" of the lever 46 and the lower end 48" of another lever 48 and turns those levers into the positions indicated by the dotted line positions of their lower ends shown in Fig. 13. As the rocker arm 8' makes its return up stroke, the spring 43 returns the lever 38 to its full line position, but does not effect a corresponding return movement of the lever 46. In consequence, the member 45 then is gravity held in its dotted line position shown in Fig. 13, in which it rests against a stop 38' carried by the lever 38, and in which its upper end is out of the path of movement of the projection 8". No subsequent counter-clockwise rotation of the rocker 8 gives movement to the lever 38 and ratchet wheel 36 until the lever 46 is again returned to its full line position.

The lever 46 is returned to its full line position as a result of a plurality of rebalancing operations, said plurality varying from a minimum of two up to a predetermined maximum which may well be twenty or thereabouts and which is fixed by the pitch of the hereinafter mentioned teeth 48' carried by the lever 48. The levers 46 and 48 are mounted to turn about the supporting stud 9 for the rocker 8, and are so mounted as to have a frictional tendency to remain in the positions assumed by them until subjected to external forces displacing them from such positions. The lever 46 is returned to its full line position by the direct, indirect or partly direct and partly indirect action of a pawl 47 pivoted at 47' to an arm of the rocker 8. The direct action on the lever 46 of the pawl 47 occurs when the pawl engages with one or first with one and then with another of two teeth 46' carried by the upper end of the lever 46. The indirect action of the pawl 47 on the lever 46 results from the engagement by the pawl of the teeth 48' carried at the upper end of the lever 48 and the movement of the latter against a projection 46a of the lever 46. Movement of the lever 48 under the action of the pawl 47 occurring after the lever has engaged the projection 46a, moves the lever 46 toward and may eventually move it into its full line position.

Whether or not on any particular clockwise rotation of the rocker 8 the pawl 47 will engage a tooth 46' of the lever 46 depends upon the position at the time of a tooth shielding member 49. The position of the member 49 at that time depends indirectly upon the position of the secondary pointer 14 and depends directly upon the position of the drive lever 16 when its advancing movement is arrested by the engagement of one of the shoulders of part 16G with the secondary pointer projection 14'. The position of the member 49 is so controlled as a result of the fact that it tends to turn clockwise under the action of gravity about the stud 9 to which it is pivotally connected and that its gravital movement is controlled by the engagement of a cam edge portion of the member 49 with an extension of the pivot pin 16D' on which the follower roll 16D is journalled.

In the neutral position of the secondary pointer, illustrated in Fig. 3 and a perfect or approximately perfect condition of potentiometer balance in which the shoulder 16G' engages the projection 14', the part 49 is held in its uppermost position by the pin 16D'. The pawl 47 is then free to engage a tooth 48' and a tooth 46' at the beginning of its down stroke and to maintain such engagement until said stroke is completed. If in such case at the beginning of said stroke the lever 46 is in its position most remote from that shown in full lines in Fig. 13, the pawl 47 will then engage the lower tooth 46' and move the lever 46 into an intermediate position in which the pawl 47, on its following down stroke, can engage the second tooth 46', if the member 49 is then also in its uppermost position shown in Fig. 13. In such case the return of the member 46 to its full line position is effected by two potentiometer rebalancing operations and results from the direct action of the pawl 47 on the teeth 46'. While in such case the pawl 47 on each stroke would engage a tooth 48' of the lever 48 and give the latter the same turning movement as is given to the lever 46, the movement given to the lever 48 would not contribute to the return of the lever 46 to its full line position. From the foregoing it will be apparent that in normal operation each actuation of the toothed wheel 36, effected through the parts 37 and 45 and the mechanism acting on the latter, institutes a new measuring period and terminates a preceding measuring period which began with the previous actuation of the wheel 36 by the pawl 37, part 45 and mechanism acting on the latter. It will be noted further that each measuring period ends either when the measuring apparatus attains a predetermined measuring status, which, with the particular form of embodiment illustrated herein, is that resulting in perfect balance at two balancing operations during the measuring period, or at the end of a predetermined number of balancing operations when said status is not obtained with a smaller number of balancing operations.

When at the beginning of the down stroke of the pawl 47, the projection 16G' engages one of the upper and lower shoulders 16G'' so that the pivot pin 16D then occupies a position downward and to the left of that shown in Fig. 13, the member 49 will occupy a lower position in which it prevents the pawl 47 from engaging either tooth 46' or from engaging any tooth 48' until the down stroke of the pawl 47 is so nearly completed that it will advance the tooth 48' engaged, only for a distance corresponding to the distance between that tooth and an adjacent tooth 48' If the series of rebalancing operations preceding each partial rotation of the ratchet wheel 36 includes none in which perfect balance is attained, the lever 48 will be advanced a tooth at a time until the predetermined number of such advances has caused the lever 48 to engage the projection 46a and move the lever 46 into its full line position. Whenever in that series of operations perfect balance is obtained, the next down stroke of the pawl 47 will directly move the lever 46 as either into its said intermediate position or into its full line position and will correspondingly advance the lever 48, and it will be apparent, therefore, that the lever 46 may be moved from its initial position into its full line position by the first two balancing operations of each if each of those operations result in perfect balance, or by any greater number of rebalancing operations including either one or two in which perfect balance is obtained, up to a maximum number of rebalancing operations required for the return of the lever 46 by the advancement of the lever 48 one step at a time, in case perfect balance is not attained prior to the last down stroke of the pawl 47 required to return the lever 46 through the action of the lever 42.

As previously stated the special control features of Figs. 12–16 may be utilized to produce compensating control effects in response to the measurements of each of two quantities having different normal values. In such case, for example, the member GD may open or close the switch $ha$ accordingly as one of the quantities measured attains or falls below its normal value, and the member GC may open or close the switch $h$ through its shoulder accordingly as the second quantity measured attains or falls below a normal value which is lower than the normal value of the first quantity.

The described switch operations may be obtained with three operative positions of the control bar C and three corresponding paths of movement of the member E. In such case when the control bar C is in its uppermost operative position and the member GD is not held in an inoperative position by the arm J, the shoulder $GD^2$ will be in position to open the switch $ha$. In the lowermost operative position of the bar C, and with the member J not holding the member GC in an inoperative position, the shoulder GC' of the member GC will be in position to close the switch $h$. In the intermediate position of the control bar C, the member GD when in its operative position will have its shoulder GD' in position to close the switch HA, and the member GC when in its operative position will have it shoulder $GC^2$ in position to open the switch $h$. To permit the intermediate position of the control bar C to be an off position for the low value quantity and an on position for the high value quantity in the manner just described, the shoulder GD' of the member GD is made longer than the shoulder GC' of the member GC as is clearly shown in Fig. 12, so that in the operative position of the member GD, the lower end of the shoulder GD' will be at a level above that occupied by the lower end of the shoulder GC' when the member GC is in its operative position. When on any forward movement of the member E, one or another of its shoulders GC', $GC^2$, etc. is in position to close or open the corresponding switch, and the latter is then already in its closed or open position, respectively, such movement of the member E will not change the switch position.

To give the control bar C of such an instrument as is shown in Figs. 12–16 its three operative positions, I advantageously provide the instrument with two control tables A and AA, each cooperating with the recorder carriage 23 as illustrated in Figs. 17 and 18.

The control table A of Figs. 17 and 18 may be identical in construction and arrangement with the control table A previously described. The second control table AA is shown as identical in its operative parts with the table A, except that the part $a^{80}$ of the table AA has its lower latch engaging edge at a higher level than the corresponding edge of the part $a^8$ of the table A for a purpose hereinafter explained; and that the table AA differs from the table A in the disposition of its recorder carriage engaging part; and that the table AA includes no counter part for the part $A^3$ of the table A which travels in the thread groove of the shaft B, so that the table AA is free for direct manual adjustment toward or away from the table A. The table AA is provided with a spring finger $A^{10}$ frictionally engaging the upper surface of the rail 24 and tending to hold the table in any position into which it has been adjusted.

The hinged part $a$ of the table AA is provided with a recorder carriage engaging part $a^{50}$ generally like the part $a^5$ of the table A. The part $a^{50}$ does not contact with the previously mentioned shoulder 23C at the high side of the recorder carriage 230, but with a shoulder 23A located at the low side of the carriage and formed by the upper edge of the corresponding apertured ear 23a. This permits the normal value of the quantities respectively determined by the setting of the control tables A and AA to be made the same or nearly the same. The index $A^{60}$ of the table AA is at the high side of the table so that when the tables A and AA are brought together as shown in Figs. 17 and 18, the index $A^6$ of the table A and the index $A^{60}$ of the table AA both register with the same scale mark on the front face of the rail 24.

To prevent the part $a^5$ of the table A from engaging and having its position determined by the recorder carriage shoulder 23A, and to prevent the part $a^{50}$ of the table AA from engaging and have its position controlled by the shoulder 23C of the recorder carriage 230, the forward edge of the shoulder 23A terminates far enough back from the front of the carriage so that the part $a^5$ may pass down in front of that shoulder, and the part $a^{50}$ is so disposed relative to the part $a$ of the table AA that it will engage the shoulder 23A and may pass down at the rear of the shoulder 23C.

The manner in which the positions of the recorder carriage 230 control the down movements of the parts $a$ of the tables A and AA so as to give the control bar C three operative positions, is illustrated diagrammatically in Figs. 19, 20 and 21, wherein the parts $a^5$ and $a^{50}$ of the tables A and AA are more widely displaced than in the limiting condition illustrated in Figs. 17 and 18. In Fig. 19 the value of the quantity being measured and indicated by the position of the carriage 230 is lower than the normal value of either of the two quantities measured and does not interfere with the down movement of either of the parts $a^5$ and $a^{50}$. While in Fig. 19 the plane of the shoulder 23C intercepts the part $a^{50}$, it has no effect on the position of the latter because the body portion of the part $a^{50}$ is located at the rear of the projections 23c, and the shoulder 23C does not interfere with the down movement of the part $a^{50}$. Insofar as the control table and recorder carriage parts are concerned, the member E of Fig. 12 may then cause each of the switches $h$ and $ha$ to be closed.

In Fig. 20, the value of the measured quantity indicated by the full line position of the carriage 230 is high enough to bring the shoulder 23A under the part $a^{50}$. In consequence, the latter can move downward only into the position shown in Fig. 20. The position assumed by the control bar C and associated parts when the part $a^{50}$ is in the position in which it can engage the shoulder 23A insures the closure of the switch $ha$ when the quantity measured is the one resulting in a control effected through the member GD of Fig. 12, and insures the maintenance of the switch $h$ in its open position when the quantity measured is the one giving rise to the control effected through the member GC.

The dotted line position, as well as the full line position of the carriage 230 in Fig. 20 corresponds to an off position of the switch $h$, and to an on position of the switch $ha$, in consequence of the fact that the latch D of the table AA is necessarily in its latching position, when the carriage 230 occupies said dotted line position. The elevation of the latch engaging shoulder $a^{80}$ of the table AA above the shoulder $a^8$ of the table A previously mentioned and shown in Fig. 18, is such that the latch D of the table AA can hold the parts $a$ of each control table in the positions in which they are held when the part $a^{50}$ engages the shoulder 23A.

When the value of the measured quantity rises to that indicated by the position of the carriage 230 in Fig. 21 in which the parts $a^5$ can engage the shoulder 23C, the table part $a$ of the table A and control bar C are prevented from moving downward below their uppermost operative positions. In consequence, the control parts then operate to effect and maintain the opening of the switch $h$ as well as of the switch $ha$.

It is possible to utilize the special control features of Figs. 12–16 in producing compensating control effects in response to measurements of two quantities having different normal values with the use of but a single control table such as the table A. In such case the control bar C may be given three operative positions by providing the single control table part $a$ with recorder carriage engaging parts of the type shown in Figs. 10 and 11. The high operative position of the control bar C is then that in which the single control table part $a$ is held up by its latch D or by the engagement of the edge $a^6$ of the part $a^5$ of Figs. 10 and 11, with the recorder carriage; the low operative position of the bar C is that in which the down movement of the part $a$ is not checked by engagement with the recorder carriage 23 which is then at the high side of the control table; and the intermediate position of the control bar C is that in which the lower edge $a^{14}$ of the control table $a^{10}$ engages the recorder carriage. With such a single table arrangement, the difference between the normal values of the two quantities is proportional to the length of the portion of the edge $a^{14}$ at the right of the part $a^5$ as seen in Figs. 10 and 11. The use of two control tables as illustrated in Figs. 17 and 18, is preferable to the use of a single control table provided with such recorder engaging parts such as are shown in Figs. 10 and 11, for several reasons among which are the greater difference between the two normal values which it is practical to obtain, and the greater ease in determining and indicating the two normal values, which with the two control table arrangement are shown by the two indexes $A^6$ and $A^{60}$.

In Figs. 22–24, I have illustrated a modification of the instrument shown in Figs. 1–7 adapted to effect an anticipatory control, whereby each control adjustment is not dependent merely upon the relative position of the control table A and recorder carriage 23, but is jointly dependent on that relative position and on the character of the change, if any, in the value of the quantity measured occurring immediately prior to such control adjustment. This result is accomplished with the mechanism shown in Figs. 22–24 by making the control action dependent not only on the extent of down movement permitted the part $a$ of the control table A, but on the position also of the part of the locking part 15 and thereby on the position of the secondary pointer 14, since, as previously explained, the part 15 occupies different positions when in operative engagement with the secondary pointer 14 dependent upon the position of the latter.

The control provisions illustrated in Figs. 22–25 comprise three switches $h$, $ha$, and $hb$ which may be similar in their construction and mounting to the switches shown in Fig. 8, except that each of the switches $ha$ and $hb$ is turned end for end from the position shown in Fig. 8, so that it is closed and opened by clockwise and counter-clockwise movements, respectively, as seen in Fig. 22. The switches $h$ and $ha$ are actuated by parts GE and GF, respectively, carried by a member EA arranged and operating generally as is the member E in Fig. 8. The parts are so arranged that the shoulders GE' and GF' of the parts GE and GF, respectively, are in position to open the switches $h$ and $ha$, respectively, when the control bar C is in its uppermost operative position, which is that shown in Fig. 22. In an intermediate position of the bar C, the shoulder $GE^2$ of the member GE is in position to close the switch $h$, but the shoulder GF' is still in position to open the switch $ha$. In a third and lowermost position of the bar C, the shoulder $GE^2$ remains in position to close the switch $h$, and the shoulder $GF^2$ of the member GF is in position to close the switch $ha$. This condition is illustrated in Fig. 24.

In Fig. 22 parts are shown in the relative positions occupied by them when the switches $h$, $ha$, $hb$ are all open. For greater clarity the switches proper are shown only in dotted outline in Fig. 22. In Fig. 22 the switch actuating arms HA' and $HA^2$ and switch frame HB cannot be seen as they are directly behind the arms HB' and $HB^2$ and switch frame HA, respectively.

The switch $hb$ of Fig. 22 is opened and closed by the arms GH' and $GH^2$ of a part GH carried by a second member EB. The latter is pivotally connected to the lower arm F by the pivot pin EF', and is constructed and operates generally like the member E previously described. The position of the member EB is not controlled by the control table part $a$, however, but by the secondary pointer 14 which controls the position of the member EB through the locking part 15 and a member M riveted thereto. The member M is formed with a vertically disposed slot M' receiving the hooked upper end of a link $M^5$ pivotally connected at its lower end to the member EB.

In the normal or neutral position of the secondary pointer 14, in which it engages the shoulder 15B of part 15, neither of the shoulders GH' and $GH^2$ of the part GH can engage the corresponding switch frame arms HB' and $HB^2$ and those arms may then occupy the positions corresponding either to the opened or closed position of the switch $hb$, as indicated in Fig. 23. When the position of the secondary pointer 14 is such that the latter is engaged the shoulder 15A, as shown in Fig. 22, the member EB occupies a position in which the movement of the lever arm F causes the shoulder GH' to engage the arm HB' and move the switch $hb$ into its open position unless already occupying that position. Conversely, when the secondary pointer 14 occupies the position in which it is engaged by the shoulder 15C, the member EB will be held in such position that when advanced by the lever arm F, the shoulder $GH^2$ will engage the arm $HB^2$ and move the switch $hb$ into its closed position, if not already in that position.

In this connection it should be borne in mind that the member 14 will come into locking engagement with one or another of the shoulders 15A, 15B and 15C accordingly as the value of the quantity measured at the time the secondary pointer 14 is positioned is higher, equal to, or lower than that indicated by the existing or last previous potentiometer adjustment. In consequence the secondary pointer 14 normally comes into engagement with the shoulder 15A when the value of the quantity measure is rising, and comes into engagement with the shoulder 15C when that value is falling, and comes into engagement with the shoulder 15B when the quantity measured is remaining constant.

Fig. 25 is a diagram illustrating the use of the switches $h$, $ha$, $hb$ of the instrument shown in Fig. 22 in controlling the operation of a reversible motor N which may be used to control a rheostat, valve or other instrumentality in accordance with changes in the value of the quantity measured by the instrument shown in part in Fig. 22. As shown in Fig. 25, the motor N has one terminal connected by a conductor 102 to a supply conductor 101, and has its other terminal connected to one end of each of two field windings N' and $N^2$. The motor N is energized for operation in one direction by the adjustment of a switch O into one position in which it connects the field winding N' through a conductor 103 to the supply conductors 100. The adjustment of the switch O into a second position energizes the motor for operation in the reverse direction by connecting the second field winding $N^2$ through conductor 103 to supply conductor 100. The switch O tends to occupy said one position but is moved into its second position when an electromagnet coil O' is energized as hereinafter described.

The motor N is permitted a predetermined extent of movement between limits fixed by limit switches $n'$ and $n^2$. The switch $n'$ limits the mode of movement due to the energization of the winding N' and the limit switch $n^2$ limits the mode of movement in the opposite direction, which can occur when the winding $N^2$ is energized. As diagrammatically shown, the limit switches $n'$ and $n^2$ are operated by a vibrating lever $N^4$ pivoted at $N^5$ and provided with a gear segment in mesh with a small spur gear carried by the motor shaft. Those skilled in the art will understand, of course, that any one of various other known forms of limit switch actuating mechanism may be employed in lieu of that shown diagrammatically in Fig. 25.

The switch O is moved from the position in which it energizes the winding N' and into the position in which it energizes the winding $N^2$, by current flow through the winding O' which has one terminal 104 connected to the supply conductor 101 and has its second terminal 105 connected to one terminal of the switch $h$. The second terminal of the switch $h$, and one terminal of each of the switches $ha$ and $hb$ are connected by a conductor 106. The other terminals of the switches $ha$ and $hb$ are connected to the supply conductor 100 by a conductor 107. In consequence the winding O' is energized only when the switch $h$ is in its closed position, and then only in case one at least of the switches $ha$ and $hb$ is also in its closed position.

In view of what has been said it will be understood that normally the switch $hb$ is moved into its open position only when the value of the quantity measured is increasing, and is moved into its closed position only when the value of the quantity measured is decreasing. When closed the switch $hb$ remains closed until the quantity measured begins to rise in value, and when opened it remains open until said value begins to decrease. While the position of the switch $hb$ thus depends upon the direction of change in value of the quantity measured, the positions of the switches $h$ and $ha$ depend upon the value of that quantity.

A proper understanding of the operative capacity of the control provisions of Figs. 22–25 and the character of the control obtainable with their use may be facilitated perhaps by considering their action under some one of the many uses to which they may be put. Assume, for example, that an instrument including the control provisions of Figs. 22–25 is used in controlling the fuel supply to a furnace the temperature of which is measured and recorded by the instrument. For such a control the motor N may operate on a fuel valve generally as the motor NA operates on the fuel valve in the hereinafter described arrangement shown in Fig. 26. Assume further that the control part $a$ is moved into its uppermost operative position when the furnace temperature rises to 960°, and that the intermediate position of the control table part $a$ corresponds to a furnace temperature of 950°. With the foregoing assumptions the instrument will tend to maintain a furnace temperature of approximately 955° under favorable conditions. Assume further that the conditions of operation are so unfavorable that the furnace temperature may fluctuate between a temperature lower than 950° and a temperature higher than 960°, and then consider an operating cycle starting with a furnace temperature which is below 950° but is rising.

At the beginning of such a cycle the switch $hb$ will be open because the furnace temperature is rising but the switches $h$ and $ha$ will both be closed because the furnace temperature is below 950°. In consequence the electromagnetic switch winding O' will be energized by current flow between the supply conductors 100 and 101 through conductors 104 and 105, switch $h$, conductor 106, switch $ha$ and conductor 107. The energization of the winding O' moves the switch member O into the position in which the motor winding $N^2$ may be energized through conductors 102 and 103.

The motor N will then be turning in the direction to increase the fuel supply unless the latter is already at a maximum and the operation of the motor has been terminated by the opening of the limit switch $n^2$. When the furnace temperature rises to 950°, the switch $ha$ will open thus interrupting the energizing circuit for the winding O' between conductors 107 and 106. When the winding O' is deenergized, the switch O moves into the position in which the winding N' is energized from the supply conductors through the conductors 102 and 103, thereby starting the motor N into operation in a direction to decrease the fuel supply to the furnace. The motor N will thereafter operate in the fuel decreasing direction until its operation is terminated by the limit switch $n'$ unless it is sooner terminated as a result of a change in the direction of furnace temperature change and the consequent closure of the switch $hb$. The closure of the switch $hb$ will result in an immediate energization of the winding O', and thereby in an immediate change in the fuel supply if the switch $h$ is then closed but not otherwise. If before its direction of change is reversed the furnace temperature has risen to 960° or above, the switch $h$ will then be open when the switch $hb$ closes, and the energization of the switch winding O' must then await the reduction of the furnace temperature to 960° and the closure of the switch $h$.

With the switches $h$ and $hb$ both closed, conductors 105 and 106 are connected by the switch $h$ and conductors 106 and 107 are connected by the switch $hb$ and the winding O' is then energized. Its energization adjusts the switch O into position in which the motor winding $N^2$ is energized and the motor N then starts into operation in the direction to increase the fuel supply.

The motor N will continue to operate in that direction until the fuel supply is at a maximum and the limit switch $n^2$ opens unless its operation is interrupted sooner by the opening of the switch $hb$ following a reversal in the direction of furnace temperature change. If notwithstanding the increase in the fuel supply the furnace temperature falls below 950° before reversing its direction of change, the switch $ha$ will close when the temperature reaches 950°. Its closure maintains an energizing circuit for the winding O' when thereafter the switch $hb$ opens. When the closure of the switch $ha$ is followed by the opening of the switch $hb$, the condition of the three switches $h$, $ha$, and $hb$ is the same as it was at the beginning of the above described cycle which may then be repeated if conditions are sufficiently unfavorable.

Under more favorable control conditions the furnace temperature will not continue to fluctuate between limits respectively below 950° and above 960°, but will be confined to a range between a lower limit above 950° and an upper limit below 960°, and for much of the time will be maintained constant or approximately constant at an intermediate temperature of, or about 955°. While the temperature is fluctuating between limits above 950° and below 960°, the control table part $a$ does not modify the positions of the switch $ha$, which is then open, and does not modify the position of the switch $h$, which is then closed. In consequence the control then effected is wholly due to the operation of the switch $hb$ which closes and thereby increases the fuel supply whenever the furnace temperature starts to fall, and which opens and thereby diminishes the fuel supply whenever the temperature starts to rise.

In the control system just described, the control action effected by the switch $hb$ may be designated an anticipatory control action, because it starts to correct for a departure of the controlled quantity from its normal value before the departure actually occurs. Due to the anticipatory control action, each change in the direction of change of the controlled quantity is followed by a corrective adjustment tending to again reverse the direction of change. On the occurrence of any change in the controlled quantity from a previous value of that quantity, the anticipatory control action tends to restore said previous value, and it is of itself sufficient to prevent any rapid departure of the average value of the control quantity away from a predetermined value. In general, however, the anticipatory control cannot prevent the average value of the controlled quantity from drifting from time to time more or less slowly in one direction or the other away from the predetermined or desired value. The control action effected by the switches $h$ and $ha$ directly tends on any departure of the controlled quantity from its normal value to restore the latter, and when used in conjunction with the anticipatory control action, tends to limit and correct for the above mentioned drift.

In Figs. 26–29 I have illustrated control provisions giving a control including both an anticipatory or follow up and escapement control actions which differ somewhat in character and in the means by which they are effected from anything previously described herein. The apparatus shown in Figs. 26–29 may be used to control a furnace, for example, and in such case the relay motor NA of Fig. 26 may be employed to adjust a furnace fuel supply valve X in response to furnace temperature measurements made by the control instrument shown in end elevation in Fig. 27. The mechanism employed in that instrument for rebalancing the potentiometer and giving movement to the recorder carriage may be identical with those previously described. Furthermore, the instrument shown in Fig. 27 may comprise a recorder carriage and control table exactly like those shown in Figs. 1–7, except that the control table may well have its recorder carriage engaging parts of the precise form illustrated in Fig. 9.

As shown in Fig. 27, a lever P pivoted to the instrument framework at P', is used in lieu of the switch actuating lever F, FA, of Figs. 1–7. The lever P is provided with a cam follower roll $P^2$ and has a gravital tendency to hold the roll $P^2$ in contact with a cam $P^3$ carried by the shaft 12. The rotation of the cam $P^3$ gives the lever a switch actuating movement about the pivot P' in the clockwise direction, as seen in Fig. 27. A switch actuating member Q is pivotally and frictionally connected to the lever P so that while the member Q can be turned relatively to the lever P about the connecting pivot PQ, it tends to remain in any position given it relative to the lever P. The position of the member Q relative to the lever P at the beginning of each switch actuating stroke of the latter, is determined jointly by the engagement of a projection Q' from the lever Q against one or another of the shoulders $C^6$, $C^7$, $C^8$, $C^9$, $C^{10}$ and $C^{11}$ of a part CA, and by the engagement of an edge portion $Q^2$ of the member Q with a projection R' from a lever R. The operative position of the latter at any time, as hereinafter explained, depends upon the position at the time of the secondary pointer 14 of the instrument. The particular shoulder of the member CA engaged by the projection Q' at any time, however, is dependent upon the position of the control bar C which is secured to the part CA. The latter is pivotally connected to the instrument framework in the same manner, as, and corresponds generally to, the part $C^2$ of the instrument of Figs. 1–7.

The control bar C of Fig. 27, which may be connected to the hinged control table part exactly as in the instrument of Figs. 1–7, has five operative positions which may be similar to those provided for with the recorder carriage engaging parts illustrated in Fig. 9. The shoulders $C^6$, $C^7$, $C^8$, $C^9$ and $C^{10}$ of the part CA are successively brought into position for engagement by the projection Q' of the member Q, as the control bar C is successively raised from its lowermost to its uppermost operative position. Said shoulders are at progressively greater distances from the pivotal axis of the member CA, so that the distances from said axis at which the projection Q' is held when in engagement with the member CA, depends upon which shoulder of the latter is engaged. When the control bar C is moved upward from its highest operative position into its clearance position, the shoulder $C^{11}$ is brought into position for engagement by the projection Q'. The shoulder $C^{11}$ is located at the same distance from the pivotal axis of the member CA as is the neutral shoulder $C^8$. The control table effect on the position of the member Q is thus the same when the control bar C is in its clearance position, as when it is in the neutral position, which it assumes when the value indicated by the recorder carriage is the normal value corresponding to the control table adjustment.

The part CA is moved into its clearance position, if not already in that position, on each switch actuating clockwise movement of the lever P as a result of the engagement of a portion $P^4$ of the lever P with a projection $C^{12}$ on the part CA. Each return movement of the lever P would permit of a corresponding down movement of the part CA and control bar C, but such down movement is prevented at times, not only by the latching up of the hinged part of the control table, but also by the hereinafter described locking means, including the locking disc S.

The above mentioned member R is pivoted on the supporting stud 16B on which the drive lever 16 is mounted, and is provided with a cam follower roll $R^3$ which co-acts with a cam $R^4$ carried by the shaft 12. The cam $R^4$ has the same contour, and the same angular setting on the shaft 12, as the cam 17, but the parts are so relatively proportioned that the clockwise movement from the neutral position shown in Fig. 27 given the member R is greater than that given the lever 16 by the cam 17. To this end, in the construction illustrated the cam follower $R^3$ is made larger in diameter than the cam follower 16D. The greater clockwise movement from their respective neutral positions given to the lever R than to the lever 16 provides adequate clearance for the adjustment of the secondary pointer 14 when the cam followers 16D and $R^3$ are in engagement with the high portions of the cams 17 and $R^4$ respectively. The lever R has a gravital tendency to move counter-clockwise and thereby maintain the follower roll $R^3$ in engagement with the cam $R^4$, but the extent of counter-clockwise movement permitted the lever R depends upon the position of the secondary pointer 14.

The position of the secondary pointer 14 regulates the counter-clockwise movement of the lever R and determines the position of the latter when the projection R' is operatively engaged by the surface $Q^2$ of the member Q, in consequence of the fact that the lever R is provided with a plurality of shoulders $R^5$ one or another of which engages the secondary pointer projection 14' on each counter-clockwise movement of the member R, and thereby arrests such movement. The shoulders $R^5$ are so positioned that each counter-clockwise movement permitted the member R is relatively large or small, accordingly as the angular movement given the secondary pointer 14 and gauging element 3 on the preceding movement of the latter into engagement with the galvanometer pointer 2 was relatively large or small. In consequence, the angular position of the member R during any engagement with the secondary pointer, depends both on the magnitude and on the direction of an immediately prior change in value of the quantity measured.

The member Q is provided with two switch actuating arms $Q^3$ and $Q^4$ which are oppositely inclined to the general direction of movement of the member Q on its switch actuating stroke, and are also axially off-set, so that the arm $Q^3$ may act on a switch actuating arm HC' and the arm $Q^4$ may act on a switch actuating arm HD' arranged alongside the arm HC', accordingly as the member Q is turned down or up from a neutral position in which the arms $Q^3$ and $Q^4$ pass respectively above and below the switch arms HC' and HD'. The switch arm HC' is secured to a suitably mounted hollow rock shaft HC carrying a switch $hc$. The arm HD' is secured to a rock shaft HD passing through the hollow shaft HC and supporting a switch $hd$. The switches $hc$ and $hd$ may be identical with the previously described switches $h$, $ha$ and $hb$.

Each of the switches $hc$ and $hd$ is spring urged into its open position when the member Q permits. When the latter is turned about its pivotal connection PQ into the position in which the arm $Q^3$ can engage the arm HC', the switch $hc$ is moved into its closed position on the following switch actuating stroke of the lever P and member Q. On the return stroke of those parts the switch $hc$ returns to its open position. The time interval between the movement of the switch $hc$ into its closed position and its return to its open position depends upon the position of the member Q relative to the member P owing to the inclination of the arm $Q^3$ to the general direction of movement of the member Q. In other words, the farther the member Q is turned downwardly from its neutral position, the longer will the switch $hc$ be held closed during the actuating stroke of the member Q. The operation of the switch $hd$ by the arm $Q^4$ is similar to the actuation of the switch $hc$ by the arm $Q^3$, but the length of the time during which the switch $hd$ is held closed on each switch actuating stroke of the member Q increases with the extent to which the member Q is turned upward from its neutral position.

In the arrangement diagrammatically illustrated in Fig. 26, the closure of the switch $hc$ energizes a reversible relay motor NA for operation in one direction, and the closure of the switch $hd$ operates the motor NA for operation in reverse direction. As shown, the motor NA has three terminals 108, 109, 110. The terminal 108 is connected to the supply conductor 100. The terminal 109 is connected to one terminal of the switch $hc$, which, when closed, connects the terminal 109 to a conductor 111 running to the supply conductor 101. The motor circuit when closed may include a field winding like the winding N' of Fig. 25, and the resultant operation of the motor NA adjusts the valve X in the closing direction, thus diminishing the fuel supply to the furnace. Similarly, the terminal 110 is connected to the switch $hd$ and when the latter is closed, is connected through conductor 111 to the supply conductor 101, and then energizes a motor field winding like the winding $N^2$ of Fig. 25, so that the motor NA will then operate on the valve X to increase the fuel supply to the furnace.

The relay motor NA is shown as connected by speed reducing gearing to a crank disc W, the crank pin W' of which is connected through a lever $W^2$ and suitable links to the operating arm X' of the fuel supply valve X. Advantageously, the motor is so arranged that numerous operations of the motor NA in one direction are required to shift the valve X from one end to the other of its range of adjustment. The number of operations in one direction of the motor NA required to give the valve X its full range of adjustment in the corresponding direction, depends, of course, on the average duration of each period of motor operation in said one direction, and also upon the number and average duration of motor operations in the opposite direction occurring during the period in which the valve is being adjusted through such range.

Insofar as the control effects of the apparatus shown in Figs. 26–29 are dependent on the position of the lever R and secondary pointer 14, the control action is an anticipatory action. Insofar as the control effects are due to the position of the control bar C, the control action is responsive to and tends directly to limit and correct for drift or departure of the controlled temperature from its normal value. Collectively the two control actions cooperate to increase the fuel supply, when the furnace temperature is falling, more rapidly when the temperature is below normal than when it is above normal, and when the furnace temperature is rising, the two control actions cooperate to decrease the fuel supply more rapidly when the furnace temperature is above normal than when it is below normal.

With such a control as may be maintained with the instrument shown in Fig. 27, it is sometimes desirable to minimize the escapement control effect due to the recorder carriage position, as compared with the control effect due to the secondary pointer. With the form of my invention illustrated in Figs. 26–29 this result may be secured, and the relative values of the two effects may be varied by neutralizing or eliminating the control effect of the control table A of the control during predetermined periods of time. This effect is secured by the means shown for periodically locking the control bar C in its elevated inoperative position, so that the projection Q' of the member Q will then engage the shoulder $C^{11}$ of the member CA. The effect of such engagement on the position of the member Q is a neutral effect exactly like that resulting from the projection Q' with the neutral or normal valve shoulder $C^8$ of the member CA.

The means shown in Figs. 27, 28 and 29 for so periodically locking the control bar C in its elevated inoperative position comprise a lock member in the form of a ratchet disc or wheel S mounted on a pivot S' and advanced a part of a turn on each oscillation of the lever P, by the engagement of a hook portion $P^5$ of the latter with a ratchet lever T carrying a pawl T' engaging a tooth of the ratchet disc. A spring $T^3$ normally holds the lever T in the position shown in which a stop projection $T^2$ of the lever engages a part of the instrument framework. On each movement of the lever P in the clockwise direction as seen in Fig. 27, the hook $P^5$ engages a shoulder $T^5$ on the lever T and turns the latter counter-clockwise against the action of the spring $T^3$. A stop $T^6$ carried by the lever T engages a portion of the instrument framework to prevent overthrow of the lever T. With the particular arrangement shown the ratchet wheel is angularly advanced a distance of two teeth on each actuation by the lever R.

The wheel S has mounted in it a plurality of pins $S^2$ which extend parallel to the pivot S' on which the wheel S turns, and each of which may be manually adjusted between an advanced position in which it overlaps, and a retracted position in which it does not overlap a lateral projection $C^{13}$ from the member CA. When the latter is in its elevated inoperative position the projection $C^{13}$ is above the level of the lowermost pins $S^2$, and is prevented from moving downward by those pins when the latter are in their advanced position. The member CA is thus prevented from moving downward until further movement of the ratchet disc S brings the pins S² which occupy their retracted position below the projection C¹³. With the construction illustrated there are as many pins S² as the ratchet has teeth and the projection C¹³ is wide enough to engage two pins at the same time. As shown in Fig. 28 four sets of two pins S² each are retracted, and between each two sets of retracted pins there are four pins S² adjusted into their advanced position. In consequence, the control bar C is held up in its uppermost inoperative position during two out of each three successive oscillations of the lever P, and the control table can exert only one third as many control effects as would be possible if all of the pins S² were retracted. By varying the relative number of advanced and retracted pins the influence on the total control action of displacements of the control table from its normal position may be increased or decreased.

In all forms of the invention illustrated herein, control effects are produced in accordance with the departures from a normal value of a quantity measured. Such control effects are produced in each case by the co-action by a control table part *a* with a recording carriage shoulder 23C or 23A. The recorder carriage, 23, 230, is an exhibiting element, and each of its shoulders 23A and 23C constitutes a pointer or index element deflecting in accordance with the varying value of the quantity measured, and each control table part *a* constitutes a co-acting pointer engaging element. The said pointer and pointer engaging elements co-act through the control bar C and link C⁵ to selectively determine the path of movement of a control actuating member E or EA in accordance with the value of the quantity measured.

The galvanometer pointer 6' deflects in response to a condition of potentiometer unbalance, and its deflections result in compensating potentiometer rebalancing adjustments and corresponding adjustments of the exhibiting element formed by the recorder carriage 23. With the forms of the invention illustrated in Figs. 22–25 and in Figs. 26–29, the control effect due to departure of the quantity measured from its normal value is supplemented or modified by a control effect due to the deflection of the galvanometer pointer. The deflection of the galvanometer pointer from its neutral position results in a potentiometer rebalancing adjustment normally effective to restore the pointer to or approximately to its neutral position. In consequence, the deflection of the galvanometer pointer from its neutral position at the time of such rebalancing operation is an approximate measure of the change in the quantity measured which has occurred during the time interval of a few seconds since the last previously made potentiometer rebalancing operation. The deflection from neutral of the galvanometer pointer from its neutral position at the time of any rebalancing operation is an approximate measure of the rate of change of the quantity measured. It follows therefore that the complete control effect produced with the apparatus of Figs. 22–25, and with that of Figs. 26–29, includes a component which is proportional to the departure of the quantity measured from a normal value, and a component which is a function of the rate and direction of change of that quantity.

Attention is again directed to the relative mechanical and operating simplicity of the control parts, and to the ease with which they may be added to or replaced in the potentiometer instrument illustrated in the drawings. In particular, it is noted that one or more than one of the control switches *h, ha, hb* can be readily mounted on the shaft I as conditions make desirable, and that the switch actuating parts G, GA, GB, etc. having properly disposed switch actuating shoulders for suitable operation of the switch or switches employed, are simple sheet metal parts easily given the proper form, and are mounted on the members E, EA, etc. so that they may be readily detached and interchanged, thus facilitating the initial assemblage of a control instrument intended for particular operating conditions, or the modification of the instrument when necessary or desirable to adapt for use with different operating conditions. This application is a continuation in part of my application, Serial No. 322,269, filed November 27, 1928 on which Patent 1,898,124 was granted January 19, 1933.

The principles of the present invention are adapted for use under conditions and for purposes differing widely from those mentioned herein by way of illustration, and while in accordance with the statutes, I have illustrated and described herein preferred embodiments of the present invention, those skilled in the art will understand that changes in the form of the apparatus disclosed may be made without departing from the spirit of the invention set forth in the appended claims, and that some features of the invention may sometimes be used to advantage without a corresponding use of other features.

Having now described my invention, what I claim as new and desire to secure by Letters Patent, is:

1. In a potentiometric control instrument, the combination with a potentiometer measuring means including a galvanometer deflecting in response to potentiometer unbalance and an element deflecting in accordance with the value of the quantity measured, of control mechanism comprising a member adjacent the path of deflection of said element and means for periodically giving said member a movement toward said path to an extent dependent on the relative positions of said element and member along said path.

2. In a potentiometric control instrument, the combination with a potentiometer for measuring the value of a quantity comprising a galvanometer deflecting in response to potentiometer unbalance and a member deflecting in accordance with the value of the quantity measured, of an element periodically moving transversely of the path of deflection of said member into a position of engagement with the latter or into a different position according to the deflection of said member, and control mechanism selectively dependent on the position into which said element moves.

3. In a potentiometric control instrument, the combination with a potentiometer for measuring the value of a quantity comprising a galvanometer deflecting in response to potentiometer unbalance and a member deflecting in accordance with the value of the quantity measured, of an element periodically moving transversely of the path of deflection of said member into positions of engagement with the latter or into a different position according to the deflection of said member, said member and element having engaging portions so shaped that the positions of said element when in engagement with said member will vary with the deflection of said member and control mechanism selectively dependent on the position into which said element moves.

4. The combination with a potentiometer instrument comprising an adjustable potentiometer, a galvanometer deflecting in response to variation between the momentary value of a quantity being measured and the value of said quantity indicated by the existing adjustment of said potentiometer, and means controlled by said galvanometer for periodically adjusting the potentiometer to minimize at each such adjustment and the existing difference between said values, and control means comprising a pointer element and pointer engaging element moved relatively to one another on each potentiometer adjustment, and means for periodically bringing said elements into engagement with one another.

5. In a potentiometric control instrument, the combination with a potentiometer for measuring the value of a quantity comprising a galvanometer deflecting in response to potentiometer unbalance and a member deflecting in accordance with the value of the quantity measured, of a control element periodically moving transversely of the path of deflection of said member into a position of engagement with the latter or into a different position when the deflection of said member corresponds, respectively, to a normal or low value of the quantity measured, and means for preventing said element from so moving when the deflection of said member corresponds to a high value of said quantity.

6. In a measuring and control instrument, the combination with measuring means, of a movable member, means periodically moving said member along one or another of a plurality of paths selectively determined by said measuring means and a control element engaged and moved by said member into one or the other of two positions accordingly as said member moves along one or another of said paths.

7. In a measuring and control instrument, the combination with measuring means, of a movable member, means periodically moving said member along one or another of a plurality of paths selectively determined by said measuring means, a control element movable back and forth between two positions and tending to remain in any position into which it is adjusted and comprising spaced apart portions one or another of which said member engages to thereby adjust said element into one or the other of said two positions, accordingly as said member moves along one or another of its paths of movement.

8. In a measuring and control instrument, the combination with measuring means, of a movable member, means periodically moving said member along one or another of a plurality of paths selectively determined by said measuring means, and a pivoted switch member having oppositely extending arms, one or the other of which is in position for engagement by said member accordingly as the latter moves along one or another of said paths.

9. In a measuring and control instrument, the combination with measuring means, of a movable member, means periodically moving said member along one or another of a plurality of paths selectively determined by said measuring means, a pivoted switch member having oppositely extending arms, one or the other of which is in position for engagement with corresponding switch member adjustment by said member accordingly as the latter moves along one or another of said paths, and frictional means tending to hold said switch member in any position assumed by it.

10. In a measuring and control instrument, the combination with measuring means, of a movable member having a pair of spaced apart actuating shoulders, means periodically moving said member along one or another of a plurality of paths of movement selectively determined by said measuring means, a control element having portions spaced apart dissimilarly to said shoulders so that one of said shoulders may engage one of said portions and adjust said element in one direction as said member moves along one path of movement and the other shoulder may engage the other part and adjust said element in a second direction as said member moves along a second path of movement.

11. In a measuring and control instrument, the combination with measuring means, of a movable member having a plurality of separated actuating portions, means periodically moving said member along one or another of a plurality of paths selectively determined by said measuring means, and a plurality of control elements having separated engaging parts said portions and parts being so relatively spaced that different portions and parts engage on movements of said member along different paths of movement.

12. In a measuring and control instrument, the combination with measuring means, of a movable member having a plurality of switch actuating portions, means periodically moving said member along one or another of a plurality of paths selectively determined by said measuring means, a plurality of switch frames pivotally supported to turn about a common axis transverse to the plane of movement of said member and each having two operating parts one at each side of said axis, said portions and parts being so relatively displaced that each switch will be tilted first in one direction and then in the other direction by the engagement first of one portion and part and then of another portion and part as said member is successively moved along different paths.

13. In a measuring and control instrument, the combination with measuring means of a movable member having a plurality of separated actuating portions, means periodically moving said member along one or another of a plurality of paths selectively determined by said measuring means, and a plurality of control elements each having two separated parts engaged by one or the other of two corresponding portions to thereby adjust said element in one predetermined manner or another on the movement of said member along one or the other of two particular paths, the parts pertaining to the different elements and corresponding portions being so disposed that each of said elements is operated first in one manner and then in the other as said member is moved successively along first one and then another of its different paths of movement.

14. In a measuring and control instrument, the combination with measuring means of a movable member, means periodically moving said member in a plane along one or another of a plurality of paths selectively determined by said measuring means, and one or more control actuating devices detachably secured to said member and each comprising two spaced apart element engaging surfaces, the said surfaces being displaced from one another both in a direction parallel to and in a direction transverse to the plane of movement of said member.

15. In a measuring and control instrument, the combination with measuring means of a movable member having a plurality of separated portions, means periodically moving said member along one or another of a plurality of paths selectively determined by said measuring means, and a plurality of control elements having separated parts, said portions and parts being so disposed that one or more of said parts are engaged by corresponding portions only on a movement of said member along a single path, while one of said parts is engaged by a particular one of said portions on movements of said member along two of its said paths.

16. In a measuring and control instrument, the combination with measuring means, of a movable member having a plurality of separated portions, means periodically moving said member along one or another of a plurality of paths selectively determined by said measuring means, and a plurality of control elements having separated parts, said portions and parts being so disposed that each part is engaged by a corresponding portion to adjust the corresponding element in a predetermined manner on the movement of said member along some one of said paths, and that two or more of said parts are engaged by corresponding portions on a movement of said member along at least one of said paths.

17. In a measuring and control instrument, the combination with a member deflecting along an elongated path in accordance with the value of the quantity measured, an elongated control bar extending along said path, pivoted supporting means engaging said bar at its opposite ends and located adjacent the opposite ends of said path and operating to turn said bar toward and away from said member, a control part which is connected to and is adjustable along the length of said bar and which does, or does not, engage said member and thereby limit the movement of said bar toward said member acording to the deflection of the latter, and control means selectively dependent upon the extent to which the movement of said bar is limited.

18. In measuring and control instrument, the combination with a guideway, an exhibiting carriage and measuring means adjusting said carriage along said guideway in accordance with the value of the quantity measured, of a control element extending along said guideway and pivotally supported to move toward and away from the path of said carriage, means for so moving said element, means variably limiting the movement of said element toward said path in accordance with the position of said carriage and comprising a carriage engaging part connected to said element for adjustment lengthwise of said guideway and control means selectively controlled by said element in accordance with the position of the latter relative to said path.

19. In a measuring and control instrument, the combination with a guideway, an exhibiting carriage and measuring means adjusting said carriage along said guideway in accordance with the value of the quantity measured, of a control element extending along said guideway and pivotally supported to move toward and away from the path of said carriage, means variably limiting the movement of said element toward said path in accordance with the position of said carriage and comprising a carriage engaging part connected to said element for adjustment lengthwise of said guideway, a control actuator, means periodically moving said actuator away from and back into an initial position, and a link connection between said actuator and element through which the latter is held away from said path when said actuator is in its initial position and through which the direction of movement of said actuator away from said initial position is made selectively dependent on the action of the first mentioned means.

20. In a measuring and control instrument, the combination with a guideway, an exhibiting carriage and measuring means adjusting said carriage along said guideway in accordance with the value of the quantity measured, of a control element extending along said guideway and pivotally supported to move toward and away from the path of said carriage, means variably limiting the movement of said element toward said path in accordance with the position of said carriage and comprising a carriage engaging part connected to said element for adjustment lengthwise of said guideway, a control actuator, means periodically moving said actuator away from and back into an initial position, and a link connection between said actuator and element through which the latter is held away from said path when said actuator is in its initial position and through which the directon of movement of said actuator away from said initial position is made selectively dependent on the movement of said element toward said path permitted by the first mentioned means.

21. In a measuring and control instrument, the combination with a guideway, an exhibiting carriage and measuring means adjusting said carriage along said guideway in accordance with the value of the quantity measured, of a control element extending along said guideway and pivotally supported to move toward and away from the path of said carriage, means variable limiting the movement of said element toward said path in accordance with the position of said carriage along one portion of said path and comprising a carriage engaging part connected to said element for adjustment lengthwise of said guideway, a control actuator, means periodically moving said actuator away from and back into an initial position, a link connection between said actuator and element through which the latter is held away from said path when said actuator is in its initial position and through which the direction of movement of said actuator away from said initial position is made selectively dependent on the movement toward said path permitted said element and means controlled by said carriage for preventing movement of said element toward said path when said member is along a portion of said path different from said first mentioned portion.

22. In a measuring and control instrument, the combination with a guideway, an exhibiting carriage and means adjusting said carriage along said guideway in accordance with the value of the quantity measured, of a control element comprising a bar portion extending along said guideway and turning about an axis toward and away from the path of said carriage, a control table adjacent and adjustable lengthwise of said guideway, a part pivoted to said table to turn about an axis coincident with the first mentioned axis and connected to said bar portion to prevent independent turning movements of said portion and part, said part having a carriage engaging portion whereby the extent of movement of said part and element toward said path is selectively dependent upon the position of said carriage, and periodically operating control means selectively dependent on said extent of movement.

23. In a measuring and control instrument, the combination with a guideway, an exhibiting carriage and means adjusting said carriage along said guideway in accordance with the value of the quantity measured, of a control element comprising a bar portion extending along said guideway and turning about an axis toward and away from the path of said carriage, a control table adjacent and adjustable lengthwise of said guideway, a part pivoted to said table to turn about an axis coincident with the first mentioned axis and connected to said bar portion to prevent independent turning movements of said portion and part, and carriage engaging means mounted on said part, whereby the extent of movement of said part and element toward said path is made selectively dependent upon the position of said carriage along said path.

24. In a measuring and control instrument, the combination with a guideway, an exhibiting carriage and means adjusting said carriage along said guideway in accordance with the value of the quantity measured, of a control element comprising a bar portion extending along said guideway and turning about an axis toward and away from the path of said carriage, a control table adjacent and adjustable lengthwise of said guideway, a part pivoted to said table to turn about an axis coincident with the first mentioned axis and connected to said bar portion to prevent independent turning movements of said portion and part, and carriage engaging means mounted in said part, whereby the extent of movement of said part and element toward said path is made selectively dependent upon the position of said carriage along said path, said last mentioned means being adjustable to vary said extent of movement permitted in a particular position of said carriage.

25. In a measuring and control instrument, the combination with measuring means, of a movable member, means periodically moving said member along a path of movement selectively controlled by said measuring means, control apparatus selectively engaged by said member on each movement accordingly as said movement is along one or another of said paths, said operating means including a yielding connection permitting the motion of said member to be arrested when said mechanism opposes abnormal resistance to said movement.

26. In a measuring and control instrument, the combination with measuring means, of a movable member, means periodically moving said member along a path of movement selectively controlled by said measuring means, control apparatus selectively engaged by said member on each movement accordingly as said movement is along one or another of said paths, said means comprising a cam actuated lever and a spring connection between said lever and said member which yields to permit the motion of said member to be arrested when said mechanism opposes abnormal resistance to said movement.

27. In a measuring and control instrument, the combination with measuring means including an element deflecting along a path in accordance with the value of the quantity measured, of a control table including a movable part, means tending to give said part periodical movements away from and back into an initial position which are selectively dependent in extent upon the position of said element along said path, and means carried by said control table and actuated by said element to prevent or permit such movements accordingly as said element is at one side or the other of a predetermined position along said path.

28. In a measuring and control instrument, the combination with measuring means including an element deflecting along a path in accordance with the value of the quantity measured, of a control table adjustable along said path and including a movable part, means tending to give said part periodical movements away from and back into an initial position which are selectively dependent in extent upon the position of said element along said path, and means carried by said control table and actuated by said element to prevent or permit such movements accordingly as said element is at one side or the other of a position along said path dependent on the adjustment of said table.

29. In a measuring and control instrument, the combination with measuring means including an element deflecting along a path in accordance with the value of the quantity measured, of a control table including a movable part, mechanism tending to give said part periodical movements away from and back into an initial position which are selectively dependent in extent upon the position of said element along said path, and means carried by said control table and actuated by said element to prevent or permit such movements accordingly as said element is at one side or the other of a predetermined position along said path, said means comprising a latch adjusted into and out of latching position by said element as the latter deflects to or back from said one side of said position.

30. In a measuring and control instrument, the combination with measuring means including an element deflecting along a path in accordance with the value of the quantity measured, of a control table including a movable part, mechanism tending to give said part periodical movements away from and back into an initial position which are selectively dependent in extent upon the position of said element along said path, and means carried by said control table and actuated by said element to prevent or permit such movements accordingly as said element is at one side or the other of a predetermined position along said path, said means comprising interlocking spring connected latch and latch lock parts respectively engaged and adjusted by said element as the latter moves to and returns from said one side.

31. In a measuring and control instrument, the combination with measuring means including an element deflecting along a path in accordance with the value of the quantity measured, of a control table including a movable part, mechanism tending to give said part periodical movements away from and back into an initial position which are selectively dependent in extent upon the position of said element along said path, and means carried by said control table and actuated by said element to prevent or permit such movements accordingly as said element is at one side or the other of a predetermined position along said path, said means comprising a latch adjusted into latching position by said element as the latter moves to said one side, a spring, and a latch lock connected by said spring to said latch and interlocking with the latter under the action of said spring to hold the latch in latching position when the latter is adjusted into said position and engaged by said element on its return movement from said one side and thereby adjusted to release said latch and permit the latter to move out of its latching position under the action of said spring.

32. In a measuring and control instrument, the combination with measuring means, of a member having a plurality of separated switch actuating portions, means periodically moving said member along one or another of a plurality of paths selectively determined by said measuring means, at least three switches each having operative parts so disposed relative to said portions that said portions and parts engage and close said switches singly and in groups in a predetermined manner as said member is moved successively along different paths of movement.

33. In a measuring and control instrument, the combination with measuring means, of a member having a plurality of separated switch actuating portions, means periodically moving said member along one or another of a plurality of paths selectively determined by said measuring means, at least three switches each having operative parts through which the switch is opened and closed on movements of said member causing said parts to be engaged by particular ones of said portions, said parts being so disposed relative to said portions that said portions and parts engage and close said switches singly and in pairs in a predetermined manner as said member is moved successively along its different paths of movement.

34. In a measuring and control instrument, the combination with measuring means, of a member having a plurality of separated actuating portions, means periodically moving said member along one or another of a plurality of paths selectively determined by said measuring means, and a signal system including at least three switches and a corresponding number of signal devices, said switches having operating parts so disposed relative to said portions that on the movement of said member along any of said paths one or more of said parts will be engaged and the corresponding switches actuated by corresponding ones of said portions, and circuit provisions so associated with said switches and signals that as said member is moved successively along first one and another of a series of said paths, said signals are successively actuated singly and in groups in a predetermined manner.

35. In a measuring and control instrument, the combination with measuring means, of a member having a plurality of separated actuating portions, means periodically moving said member along one or another of a plurality of paths selectively determined by said measuring means, and a signal system including at least three switches and a corresponding number of signal devices, said switches having operating parts so disposed relative to said portions that on the movement of said member along any of said paths one or more of said parts will be engaged and the corresponding switches actuated by corresponding ones of said portions, and circuit provisions so associated with said switches and signals that as said member is moved successively along first one and then another of a series of said paths, a series of different signal actuations are effected.

36. In a measuring and control instrument, the combination with measuring means alternately measuring two quantities, a movable member, means moving said member along a path of movement selectively controlled by said measuring means on each operation of said measuring means, and a pair of actuating devices mounted on said member and each adjustable relative thereto into and out of an operative position.

37. In a measuring and control instrument, the combination with measuring means, of a movable member, means periodically moving said member along a path of movement selectively controlled by said measuring means, a pair of actuating devices mounted on said member and each adjustable relative thereto into and out of an operative position, separate control elements respectively cooperating with the two devices when the latter are in their operative positions, means for adjusting said measuring means to alternately measure two quantities, and means for adjusting one of said devices into and the other out of its operative position on each such adjustment of the measuring means.

38. In a measuring and control instrument, the combination with measuring means, of mechanism for adjusting said measuring means to alternately measure two quantities, a movable member, means periodically moving said member along a path of movement selectively controlled by said measuring means, a pair of actuating devices mounted on said member and each adjustable relative thereto into and out of an operative position, and means operatively connected to said mechanism for adjusting one of said devices into and the other out of its operative position on each adjustment of the measuring means by said mechanism.

39. In a measuring and control instrument, the combination with measuring means alternately measuring two quantities, of a pair of control elements one pertaining to each quantity, and mechanism for operating each of said elements in one way or another accordingly as the measured value of the corresponding quantity is as great as or is below a value which is normal for that quantity and which is different from the normal value for the other quantity, said mechanism including a movable member, means periodically moving said member along one or another of three paths selectively determined by said measuring means, one of said paths resulting from a measurement not less than the normal value of the quantity having the higher normal value, a second path resulting from a measurement less than the normal value of the quantity having the lower normal value and the third path result from a measurement equalling the lower and less than the higher normal value, a pair of actuating devices mounted on said member one for actuating one and the other for actuating the second of said elements, and means for holding each device in an inoperative position when the quantity being measured is not that to which the corresponding element pertains.

40. In a measuring and control instrument, the combination with an exhibiting carriage movable along a path, of means for measuring a plurality of quantities one after another and for adjusting said carriage at the time of each such measurement into a position along said path corresponding to said measurement, control parts arranged along said path each in a position corresponding to the normal value of a corresponding one of said quantities, and means selectively dependent upon the relative position along said path of said carriage and a corresponding one of said parts for effecting a compensating control effect on each such measurement when the quantity measured is not at its normal value.

41. In a measuring and control instrument, the combination with an exhibiting carriage movable along a path, of means for alternately measuring two quantities and for correspondingly adjusting said carriage along said path on each such measurement, means for producing a control effect dependent on the difference between each such measurement and a normal value of the quantity measured including a control element comprising a bar portion extending along said guideway and turning toward and away from said path and means for variably limiting the turning movements of said element toward said path in accordance with the position of the carriage along the latter comprising two control tables spaced along said path in respective correspondence with the normal values of the two quantities and a separate carriage engaging part pivoted to each table and turning with said element, said parts and carriage being so shaped that said element approaches more closely to said path on a measurement corresponding to the normal value of one quantity than on a measurement corresponding to the normal value of the other quantity.

42. In a measuring and control instrument, the combination with an exhibiting carriage movable along a path, of means for alternately measuring two quantities and for correspondingly adjusting said carriage along said path on each such measurement, means for producing a control effect dependent on the difference between each such measurement and a normal value of the quantity measured including a control element comprising a bar portion extending along said guideway and turning toward and away from said path and means for variably limiting the turning movements of said element toward said path in accordance with the position of the carriage along the latter comprising two control tables spaced along said path in respective correspondence with the normal values of the two quantities and a separate carriage engaging part pivoted to each table and turning with said elements, said parts and carriage being so shaped that said element approaches more closely to said path on a measurement corresponding to normal and sub-normal values of one quantity than on measurements corresponding respectively to normal and sub-normal values of the other quantity.

43. In a measuring and control instrument, the combination with an exhibiting carriage movable along a path, of means for alternately measuring two quantities and for correspondingly adjusting said carriage along said path on each such measurement, means for producing a control effect following each such measurement dependent on the difference between the measurement and a normal value of the quantity measured including a control element comprising a bar portion extending along said guideway and turning toward and away from said path, means variably limiting the movements of said element toward said path in accordance with the position of the carriage along the latter and comprising two control tables spaced along said path in respective correspondence with the normal values of the two quantities and a carriage engaging part pivoted to each table and turning with said element said carriage having separate portions for engagement by said parts so shaped relatively to the latter that said element approaches more closely to said path on a measurement corresponding to a normal value of one quantity than on a measurement corresponding to the normal value of the other quantity and said parts being so relatively disposed that each of said parts engages a carriage portion not engaged by the other.

44. In a measuring and control instrument, the combination with an exhibiting carriage movable along a path, of means for alternately measuring two quantities and for correspondingly adjusting said carriage along said path on each such measurement, means for producing a control effect dependent on the difference between each such measurement and a normal value of the quantity measured including a control element comprising a bar portion extending along said guideway and turning toward and away from said path, means variably limiting the movements of said element toward said path in accordance with the position of the carriage along the latter and comprising two control tables spaced along said path in respective correspondence with the normal values of the two quantities, a separate carriage engaging part pivoted to each table and turning with said element, said parts and carriage being so shaped that said element approaches more closely to said path on a measurement corresponding to the normal value of one quantity than on a measurement corresponding to the normal value of the other quantity, and means mounted on each table and actuated by said carriage for holding said element against an extent of movement toward said path when said carriage is at the high side of a position corresponding to the normal value of the corresponding quantity which is permitted when the carriage is at the low side of the last mentioned position.

45. In a potentiometric control instrument, the combination with a potentiometer, of switch mechanism for connecting a plurality of sources of electromotive force to said potentiometer one after another in regular succession, a control mechanism, periodically operating potentiometer rebalancing means, and means operating said switch and control mechanisms invariably after a predetermined number of rebalancing operations or after a smaller number of rebalancing operations when the latter result in suitable potentiometer rebalance.

46. In a potentiometric control instrument, the combination with a potentiometer, of switch mechanism for connecting a plurality of sources of electromotive force to said potentiometer one after another in regular succession, a plurality of control elements one pertaining to each of said sources, periodically operating potentiometer rebalancing means, and means operating invariably after a predetermined number of rebalancing operations following the connection of a source to said potentiometer or after a smaller number of rebalancing operations when the latter result in a suitable potentiometer rebalance, to actuate said switch mechanism and the control element pertaining to the said source.

47. In a potentiometric control instrument, the combination with a potentiometer and means for effecting periodical rebalancing adjustments of the potentiometer when the latter becomes unbalanced, intermittently operating recording means, intermittently operating control means, and actuating mechanism for said recording and control means the frequency of operation of which is automatically dependent upon the number of potentiometer rebalancing adjustments necessary to restore potentiometer balance when the potentiometer becomes unbalanced.

48. In a potentiometric control instrument, the combination with a measuring potentiometer, of means for effecting periodical potentiometer rebalancing operations, a member, means for moving said member from a first position into a second position on the rebalancing operation following a movement of the member into said first position and for giving said member a return movement toward said first position on each subsequent rebalancing operation, the magnitude of each such return movement depending upon a condition of potentiometer balance at the time, and control means controlled by the position of said member for exerting a control effect selectively dependent upon potentiometer conditions when said member is returned to said first position.

49. In a potentiometer control instrument, the combination of a potentiometer, means for effecting periodical potentiometer rebalancing operations, a member, means for moving said member from a first position into a second position on the rebalancing operation following the movement of said member into said first position and for giving said member a return movement toward said first position on each subsequent rebalancing operation, the magnitude of each such return movement depending upon a condition of potentiometer balance at the time, means tending to effect control adjustments dependent on the value of the quantity measured following each rebalancing operation, and means through which said member holds the last means inoperative when said member is out of said first position.

50. The method of control tending to maintain a quantity at a predetermined value which consists in measuring said quantity at regular intervals and at similar intervals exerting regulating effects which tend to return said quantity to said predetermined value on a departure therefrom and each of which is the resultant of two factors one of which is dependent on the difference between two successively measured values of said quantity and the other of which is dependent on the difference between one of said values and said predetermined value, said resultant being independent of other measured values of said quantity.

51. The method of control for maintaining a quantity at a predetermined value which consists in successively measuring the value of said quantity at regularly successive intervals and at such intervals exerting successive regulating effects tending to bring said quantity to the predetermined value when different from the latter, and each of which is a function of the departure of said quantity from its predetermined value and of the rate of change in said value.

52. A control instrument comprising measuring apparatus including a potentiometer and a galvanometer giving a quantity measuring deflection which is a measure of the difference between the value of the quantity measured at any instant, and the value of that quantity which is then indicated by the existing adjustment of the potentiometer, means controlled by the galvanometer for automatically rebalancing the potentiometer at intervals to bring the adjustment of the latter into correspondence with the value of said quantity at the time of each rebalancing operation, and control provisions jointly dependent upon said galvanometer deflection and upon the displacement of the potentiometer balancing means from a neutral position.

53. A control instrument comprising measuring apparatus including a potentiometer and a galvanometer giving a quantity measuring deflection which is a measure of the difference between the value of the quantity measured at any instant, and the value of that quantity which is then indicated by the existing adjustment of the potentiometer, means controlled by the galvanometer for automatically rebalancing the potentiometer at intervals to bring the adjustment of the latter into correspondence with the value of said quantity at the time of each rebalancing operation, a selective control element, and means for adjusting the latter into different control positions comprising means responsive to the galvanometer deflection and means responsive to the changes in adjustment of said rebalancing means.

54. A control instrument comprising measuring apparatus including a potentiometer and a galvanometer giving a quantity measuring deflection which is a measure of the difference between the value of the quantity measured at any instant, and the value of that quantity which is then indicated by the existing adjustment of the potentiometer, means controlled by the galvanometer for automatically rebalancing the potentiometer at intervals to bring the adjustment of the latter into correspondence with the value of said quantity at the time of each rebalancing operation, a selective control element, means for adjusting the latter into different control positions comprising means responsive to the galvanometer deflection and means responsive to the changes in adjustment of said rebalancing means, and a control relay controlled by the position of said element.

55. The combination with a potentiometer instrument comprising an adjustable potentiometer, a galvanometer deflecting in response to a variation between the momentary value of a quantity to be measured and the value of said quantity indicated by the existing adjustment of said potentiometer, and means controlled by said galvanometer for periodically adjusting the potentiometer to minimize any then existing difference between said values, of a control element, means for adjusting said element at each potentiometer adjusting operation into a position jointly dependent upon the galvanometer deflection, and upon the displacement of the potentiometer adjustment from that corresponding to a normal value of said quantity, and control means selectively controlled by the position of said element.

56. The combination with a potentiometer instrument comprising an adjustable potentiometer, a galvanometer deflecting in response to a variation between the momentary value of a quantity to be measured and the value of said quantity indicated by the existing adjusting of said potentiometer, and means controlled by said galvanometer for periodically adjusting the potentiometer to minimize any then existing difference between said values, of a control element, means for adjusting said element at each potentiometer adjusting operation into a position jointly dependent upon the direction and extent of galvanometer deflection, and upon the displacement of the potentiometer adjustment from that corresponding to a normal value of said quantity, and control means selectively controlled by the position of said element.

57. The combination with a potentiometer instrument comprising an adjustable potentiometer, a galvanometer deflecting in response to a variation between the momentary value of a quantity to be measured and the value of said quantity indicated by the existing adjustment of said potentiometer, and means controlled by said galvanometer for periodically adjusting the potentiometer to minimize any then existing difference between said values, of a control element, means for adjusting said element at each potentiometer adjusting operation into a position jointly dependent upon the current galvanometer deflection, and upon the direction and extent of the displacement of the potentiometer adjustment from that corresponding to a normal value of said quantity, and control means selectively controlled by the position of said element.

58. In a potentiometric control instrument, the combination with potentiometer measuring means including a galvanometer deflecting in response to potentiometer unbalance and a part deflecting in accordance with the value of the quantity measured, of a rocking element angularly adjusted in accordance with the galvanometer deflection, a second rocking element angularly adjusted in accordance with the deflection of said part from a predetermined point along its path of deflection, periodically actuated means, connections from said rocking elements to the last mentioned means whereby the latter is adjusted in accordance with the angular positions of said elements, and control elements periodically actuated by the last mentioned means in selective accordance with the adjustment of said means.

59. In a potentiometric control instrument, the combination with potentiometer measuring means including a galvanometer deflecting in response to potentiometer unbalance and a part deflecting in accordance with the value of the quantity measured, a pair of members, operating mechanism for periodically moving one of said members along paths selectively dependent upon the deflection of said galvanometer and the other along paths selectively dependent upon the position of said part, and a control mechanism subjected to adjustment by each of said members in accordance with their paths of movement.

60. In a potentiometer control instrument, the combination with potentiometer measuring means including a galvanometer deflecting in response to potentiometer unbalance and a part deflecting in accordance with the value of the quantity measured, a pair of members, operating mechanism including an oscillating element to which said members are pivoted for periodically moving one of said members along paths selectively dependent upon the deflection of said galvanometer and the other along paths selectively dependent upon the position of said part, and a control mechanism subjected to adjustment by each of said members in accordance with their paths of movement.

61. In a potentiometric control instrument, the combination with a potentiometer for measuring the value of a quantity including a galvanometer deflecting in response to potentiometer unbalance and a member deflecting in accordance with the value of the quantity measured, a pair of actuators, operating means giving said actuators periodical movements along paths which for one actuator are selectively dependent upon the deflection of said galvanometer and for the other actuator are selectively dependent upon the deflection of said member, and control switches adjusted by said actuators in accordance with their paths of movement.

62. In a potentiometric control instrument, the combination with potentiometer measuring means including a galvanometer deflecting in response to potentiometer unbalance and a part deflecting in accordance with the value of the quantity measured, of control actuating means including a periodically moving element, two actuating devices adjustably mounted on said element, means adjusting one of said devices relative to said element in accordance with the galvanometer deflection, means adjusting the second of said devices in accordance with the deflection of said part relative to a point along its path of deflection and control mechanism adjusted by said element in selective accordance with the adjustments of said devices.

63. In a potentiometric control instrument, the combination with a potentiometer measuring means including a galvanometer deflecting in response to potentiometer unbalance and an element deflecting in accordance with the value of the quantity measured, a pair of members, mechanism for periodically moving one of said members along paths selectively dependent upon the deflection of said element and the other member along paths selectively dependent upon the deflection of said galvanometer, and a control mechanism subjected to adjustment by each of said members in accordance with their paths of movement, said mechanism including a part which is or is not engaged and adjusted by said other member accordingly as its path of movement does or does not correspond to a galvanometer deflection away from neutral position.

64. In a potentiometric control instrument, the combination with potentiometer measuring means including a galvanometer deflecting in response to potentiometer unbalance and a member deflecting in accordance with the value of the quantity measured, of a control circuit including three control switches, and means for opening and closing one of said switches in accordance with the deflection of said galvanometer in one direction or the other, and means for opening and closing the other two switches in accordance with the deflection of said member into different predetermined positions.

65. In a control instrument, the combination with means for measuring the value of a quantity, of control provisions comprising three associated control elements each having two operative positions, means controlled by said measuring means for maintaining one element in one position or the other accordingly as the value of the quantity measured is or is not less than a predetermined value and for maintaining a second element in one or the other of its positions accordingly as the value of the quantity measured is or is not less than a predetermined value lower than the first mentioned predetermined value, and means controlled by said measuring means for adjusting the third element into one position on any decrease, and into its other position on any increase in the value of the quantity measured.

66. In a control instrument, the combination with means for measuring the value of a quantity, of control provisions comprising three associated control elements each having a first and second positions, means controlled by said measuring means for maintaining one element in its first or second position accordingly as the value of the quantity measured is or is not less than a predetermined value, and for maintaining a second element in its first or second position accordingly as the value of the quantity measured is or is not less than a predetermined value lower than the first mentioned predetermined value, means controlled by said measuring means for adjusting the third element into its first position on any decrease and into its second position on any increase in the value of the quantity measured and means dependent on the positions of said elements for creating one control effect when said one element is in its first position and either of the other two elements is in its first position and for creating an opposing control effect whenever said one element is in its second position and whenever both of the other two elements occupy their second positions.

67. The combination with apparatus producing a measurable effect and means adjustable to vary said effect, of measuring means including a member deflecting in accordance with the value of said effect and a member deflecting in accordance with the rate of change in said effect and mechanism controlled by said members to adjust said means to increase or decrease the effect when the value of the latter is respectively below a certain amount or above another and higher certain amount, and to adjust said means when the value of said effect is intermediate said certain amounts to increase or decrease said effect accordingly as said effect is diminishing or increasing.

68. The combination with a furnace and adjustable means regulating the furnace heat supply, of means measuring a furnace temperature comprising a member deflecting in accordance with said temperature and a member deflecting in accordance with the rate of change of said temperature, and mechanism controlled by said members to adjust said means to increase or decrease the furnace heat supply when said temperature is respectively below a certain value or above a certain higher value, and when said temperature is between said certain values, to adjust said means in a direction tending to increase or decrease said heat supply accordingly as said temperature is falling or rising.

69. In a potentiometric control instrument, the combination with potentiometer measuring means including a galvanometer deflecting in response to potentiometer unbalance and an element deflecting in accordance with the value of the quantity measured, control means subjected at intervals to adjustments each depending upon the then deflection of the galvanometer, and means for modifying the effect of said adjustments in accordance with the deflection of said element at intervals less frequent than the first mentioned intervals.

70. In a potentiometric control instrument, the combination with potentiometer measuring means including a galvanometer deflecting in response to potentiometer unbalance and an element deflecting in accordance with the value of the quantity measured, control means subjected at intervals to adjustments each depending upon the then deflection of the galvanometer, and means for modifying the effect of said adjustments in accordance with the deflection of said element at intervals less frequent than the first mentioned intervals, the last mentioned means comprising a disc advanced a fraction of a revolution on each such adjustment and a member acted on by said disc on each of predetermined angular movements of the latter greater than said revolution fraction.

71. In a potentiometric control instrument, the combination with potentiometer measuring means including a galvanometer deflecting in response to potentiometer unbalance and an element deflecting in accordance with the value of the quantity measured, control means subjected at intervals to adjustments each depending upon the then deflection of the galvanometer, and means for modifying the effect of said adjustments in accordance with the deflection of said element at intervals less frequent than the first mentioned intervals, the last mentioned means comprising a disc advanced a fraction of a revolution on each such adjustment and a part mounted on said disc and separately adjustable into one or the other of two positions and a member co-acting with such of said parts as are in one of said positions.

72. In a control instrument, the combination with periodically operating means, of a control member tending to operate on each operation of said means and mechanism holding said member inoperative during certain of said operations and comprising a rotatable element advanced a fraction of a revolution by said means on each operation of the latter and parts carried by said element which engage said member and prevent the latter from operating except at intervals longer than those between successive periodical operations.

73. In a measuring and control instrument, the combination with measuring means including a deflecting member, of a control element, means tending to adjust said element from an initial position into a second position varying with the deflection of said member at intervals, means retaining said member in its said initial position at predetermined ones of said intervals, and control mechanism actuated at each of said intervals in selective accordance with the position of said element.

74. In a measuring and control instrument comprising a member deflecting in accordance with the value of a quantity measured, of control actuating mechanism operating at intervals, adjusting means for said mechanism including a member which said mechanism tends to move out of and back into an initial position on each operation, means making the extent of movement of said member out of its initial position dependent on the deflection of said member, means actuated by said mechanism for holding said member in said initial position during certain of said operations.

75. In a potentiometric control instrument, the combination with potentiometer measuring means including a galvanometer deflecting in response to potentiometer unbalance and a part deflecting in accordance with the value of the quantity measured, of a periodically moving element, an actuating device adjustably mounted on said element, means for adjusting said device relative to said element in joint response to the galvanometer deflection and to the deflection of said part from a point along its point of deflection and control mechanism adjusted by said element in selective accordance with the adjustment of said device.

76. In a potentiometric control instrument, the combination with potentiometer measuring means including a galvanometer deflecting in response to potentiometer unbalance and a part deflecting in accordance with the value of the quantity measured, of a periodically moving element, an actuating device adjustably mounted on said element, means for adjusting said device relative to said element on certain of its periodical movements in joint response to the deflection of the galvanometer and to the deflection of said part from a point along its path of deflection, and adjusting said device relative to said element at other periodical movements of the latter in sole response to the deflection of the galvanometer and control mechanism adjusted by said element in selective accordance with the adjustment of said device.

77. In a potentiometer control instrument, the combination with potentiometric measuring means including a galvanometer deflecting in response to potentiometer unbalance and a part deflecting in accordance with the value of the quantity measured, of an element having a periodical to and fro movement, an actuating device pivotally mounted on said element, two abutments, one at each side of the pivotal connection between said device and element, which are engaged by said device on a movement of the element in one direction and thereby adjust said device relative to said element in accordance with the adjustments of said abutments, means for adjusting one of said abutments in accordance with the galvanometer deflection, means adjusting the other abutment in accordance with the deflection of said part from a point along its path of deflection, and control mechanism actuated by said element in selective accordance with the adjustment of said device.

78. In a potentiometric control instrument, the combination with potentiometric measuring means including a galvanometer deflecting in response to potentiometer unbalance and a part deflecting in accordance with the value of the quantity measured, of an element having a periodical to and fro movement, an actuating device pivotally mounted on said element, two abutments, one at each side of the pivotal connection between said device and element, which are engaged by said device on a movement of the element in one direction and thereby adjust said device relative to said element in accordance with the adjustments of said abutments, means for adjusting one of said abutments in accordance with the galvanometer deflection on each periodical movement of said element, means for periodically adjusting the other abutment in accordance with the deflection of said part from an intermediate point along its path of deflection on certain of said periodical movements and for holding it in a fixed position on the other of said movements and control mechanism actuated by said element in selective accordance with the adjustment of said device.

79. In a potentiometric control instrument, the combination with potentiometric measuring means including a galvanometer deflecting in response to potentiometer unbalance and a part deflecting in accordance with the value of the quantity measured, of an element having a periodical to and fro movement, an actuating device pivotally mounted on said element, two abutments, one at each side of the pivotal connection between said device and element, which are engaged by said device on a movement of the element in one direction and thereby adjust said device relative to said element in accordance with the adjustments of said abutments, means for adjusting one of said abutments in accordance with the galvanometer deflection, means for adjusting the other abutment in accordance with the deflection of said part from a point along its path of deflection, means for preventing such adjustment of one of said abutments on certain of the periodical movements of said element, and control mechanism actuated by said element in selective accordance with the adjustment of said device.

80. In a potentiometric control instrument, the combination with potentiometric measuring means including a galvanometer deflecting in response to potentiometer unbalance and a part deflecting in accordance with the value of the quantity measured, of an element having a periodical to and fro movement, an actuating device pivotally mounted on said element, two abutments, one at each side of the pivotal connection between said device and element, which are engaged by said device on a movement of the element in one direction and thereby adjust said device relative to said element in accordance with the adjustments of said abutments, means for adjusting one of said abutments in accordance with the galvanometer deflection, means adjusting the other abutment in accordance with the deflection of said part from a point along its path of deflection, means for preventing such adjustment of one of said abutments on certain of the periodical movements of said elements, said last mentioned means being adjustable to vary the number of such movements on which abutment adjustment is prevented, and control mechanism actuated by said element in selective accordance with the adjustment of said device.

81. The combination with a potentiometer instrument comprising an adjustable potentiometer, a galvanometer deflecting in response to variation between the momentary value of a quantity to be measured and the value of said quantity indicated by the existing adjustment of said potentiometer, and means controlled by said galvanometer for periodically adjusting the potentiometer to minimize any then existing difference between said values, of a floating lever element, means for adjusting said element at each potentiometer adjusting operation comprising a positioning part engaged by said element and adjusted into a position dependent upon the current galvanometer deflector and a second positioning part engaged by said element and adjusted into a position dependent upon the displacement of the potentiometer adjustment from that corresponding to a normal value of said quantity, and control means selectively controlled by the position of said element.

82. The combination with apparatus producing a measurable effect and means adjustable to vary said effect, of measuring means including a member deflecting in accordance with the value of said effect, a member deflecting in accordance with the rate of change of said effect, and mechanism controlled by said members to adjust said means to increase said effect, when the latter is diminishing, at a rate more or less rapid accordingly as the value of said effect is or is not below a certain amount, and to adjust said means to decrease said effect, when the latter is increasing, at a rate more or less rapid accordingly as the value of said effect is or is not above a certain amount.

83. The combination with a furnace and means for adjusting its heat supply, of potentiometer means measuring a furnace temperature and including a galvanometer responding to potentiometer unbalance and a member deflecting in accordance with the value of said effect, of means jointly controlled by the deflections of said galvanometer and member for adjusting the first mentioned means to increase the furnace heat supply, when said effect is diminishing, at a rate more or less rapid accordingly as the value of said effect is or is not below a predetermined amount, and to diminish the furnace heat supply, when said effect is increasing, at a rate which is more or less rapid accordingly as the value of said effect is or is not above said predetermined amount.

84. A control instrument including a potentiometer and means acting in response to unbalance in said potentiometer, means for automatically re-balancing said potentiometer in accordance with the action of the first mentioned means and control provisions jointly dependent upon said action and upon the displacement of the potentiometer balancing means from a neutral position.

85. In a control instrument, the combination of an element deflecting along a path, a cooperating element alongside said path, one of said elements comprising an engaging portion part and the other element comprising a plurality of parts relatively displaced in a direction transverse to said path and means for varying the effective length of one of said parts in the direction of said path, and means for giving said elements relative movements in a direction transverse to said path terminating in the engagement of said portion and one or another of said parts when said elements are so relatively disposed along said path as to permit such engagement.

86. In a control instrument, the combination of an element deflecting along a path, a cooperating element alongside said path one of said elements comprising an engaging portion and the other element comprising two overlapping parts each having an index part engaging edge extending longitudinally of said path and adjustably connected to permit a variation in the extent to which one of said edges extends beyond the other, said edges being relatively displaced in a direction transverse to said path, and means for giving said elements relative movements in a direction transverse to said path effecting engagement of said portion with one or the other of said edges.

87. In a control instrument, the combination of an element deflecting along a path, a second element alongside said path, one of said elements comprising an engaging portion and the other element comprising two overlapping parts each having an index portion engaging edge extending longitudinally of said path said edges being normally displaced to different extents from said index portion in a direction transverse to said path, said parts being relatively adjustable to vary the extent to which the edge normally more remote from said path extends past the other edge toward one end of said path, and means giving said element relative movements in a direction transverse to said path whereby said portion engages one or the other of said edges when the relative disposition of said elements along said path permit such engagement.

88. In a control instrument, the combination of an element deflecting along a path, a cooperating element alongside said path one of said elements comprising an index extending transversely to said path and the other element comprising a support and a part adapted for detachable connection to said support in different relative positions, and having an index engaging edge elongated in the direction of said path with different portions thereof relatively displaced in a direction transverse to the length of said path, the contour of said edge being varied by the connection of said part to said support in said different positions, and means giving said elements relative movements transverse to said path to bring said portion and edge into engagement.

89. In a measuring and control instrument, the combination with a member deflecting in accordance with the value of a quantity measured, of an element having a periodical to and fro motion, an actuating device pivotally mounted on said element, two abutments, one at each side the pivotal connection between said device and element, which are engaged by said device on a movement of the element in one direction and thereby adjust said device relative to said element in accordance with the relation of said abutments and means for periodically adjusting one of said abutments in accordance with the deflection of said member from an intermediate point along its path of deflection and control mechanism actuated by said element in selective accordance with the adjustment of said device.

90. In combination, a measuring instrument, means for producing a control effect selectively dependent upon the instrument measurement, and means responsive to the attainment of a predetermined measuring status of the instrument for causing the first mentioned means to produce its said effect on the attainment of said status, or at the end of a predetermined time interval if said status is not attained during said interval.

91. A self-balancing instrument comprising a deflecting galvanometer, a balancing device and actuating means acting at regular intervals to adjust said device in accordance with the deflection of the galvanometer, and in combination therewith, control mechanism operating at the end of each of successive measuring periods, each of which includes a plurality of said intervals for effecting a control function selectively dependent on the adjustment of said device at the time, and means actuated by said actuating means and controlled by the deflection of said galvanometer for setting said mechanism into operation and thereby ending the corresponding measuring period after a plurality of said intervals dependent in number upon the character of galvanometer deflections occurring during said period.

92. The method of control for maintaining a quantity at a predetermined value which consists in effecting measurements of said quantity throughout a period of operation in which said quantity varies from said value whereby both departure of said quantity from said value and the rate of change in said quantity during said period may be determined, and exerting regulating effects during said period tending to bring said quantity to said predetermined value each of which effects is a function of the departure of said quantity from its predetermined value and of the rate of change in said quantity.

93. The method of control tending to maintain a quantity at a predetermined value which consists in measuring said quantity at regular intervals and at similar intervals exerting regulating effects which tend to return said quantity to said predetermined value on a departure therefrom and each of which is the resultant of two factors one of which is dependent on a difference in sign of two successively measured values of the quantity and the other of which is dependent on the presence of a difference between one of said values and said predetermined value.

THOMAS R. HARRISON.